United States Patent Office 3,637,693
Patented Jan. 25, 1972

3,637,693
HYDROXYARYLQUINAZOLINES AND THEIR USE AS UV-ABSORBERS
Jan-Erik Anders Otterstedt, Pennsville, N.J., and Richard Pater, Wilmington, Del., assignors to E. I. du Pont de Nemours and Company, Wilmington, Del.
No Drawing. Filed July 12, 1968, Ser. No. 744,310
Int. Cl. C07d 51/48
U.S. Cl. 260—251
13 Claims

ABSTRACT OF THE DISCLOSURE

Novel ultra-violet absorbing 2-(o-hydroxyaryl)quinazolines of the formula

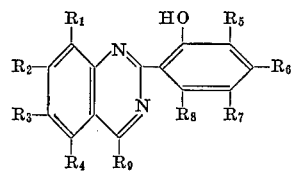

wherein $R_{1-4}$ are selected from H and other substituents having Hammett para sigma values of $-0.67$ to $+0.78$; $R_{5-8}$ are selected from H and other substituents having Hammett para sigma values of $-0.67$ to $+0.25$; and $R_9$ is selected from H and substituents, other than hydroxyl, having a Hammett para sigma value of $-0.67$ to $+0.25$; said substituents, when other than a single hydrogen or halogen atom, being joined to the quinazoline ring through a carbon, nitrogen or oxygen atom; and the use of such compounds as light screens and photostabilizers in photodegradation-prone substrates.

---

This invention concerns novel ultra-violet absorbing hydroxyarylquinazolines which are highly resistant to degradation by ultra-violet light and useful as light screens and photostabilizers.

Degradative effects of ultra-violet light on various materials are well known. The problem is especially acute with polymeric materials subject to exposure to sun light for long periods of time, and the art has proposed to use various additives as ultra-violet screens or photostabilizers.

One important photo-stabilizer class includes hydroxyaryl-substituted aromatic compounds wherein the hydroxyl hydrogen is H-bonded to an electron donating element of the conjugated system, such as carbonyl oxygen or imino-nitrogen. Such compounds in general are believed to function as ultra-violet screens by absorbing ultra-violet light, whereby they are raised to a higher energy state, internally converting the absorbed energy to relatively innocuous vibrational energy within the molecular framework, and transferring the converted energy to the surroundings as heat. Thus, by such radiationless process, the photo-excited molecule decays to its ground state where it again becomes available to absorb incident light and repeat the energy-dissipating process.

Many commercially available photostabilizers, including o-hydroxyaryl benzophenones and o-hydroxyaryl benzotriazoles, are not entirely satisfactory, particularly for long-time use, as they are somewhat limited in their ability to dissipate their absorbed light energy through radiationless decays. Accordingly, during each cycle some fraction of the photoexcited UV-absorber undergoes side reactions, either decomposing or attacking its surroundings, with the result that gradually on prolonged exposure the effective concentration of the UV-screen is depleted and the substrate deteriorates.

It is accordingly among the objects of the present invention to provide new ultra-violet absorbers with high inherent photostability, that is, that internally dissipate their absorbed light energy with high efficiency. It is a further object to provide such photostabilizers readily adapted for use as ultraviolet screens in a wide variety of substrates and applications.

BRIEF SUMMARY OF THE INVENTION

These and other objectives are accomplished according to the present invention by novel 2-(o-hydroxyaryl) quinazolines of the formula

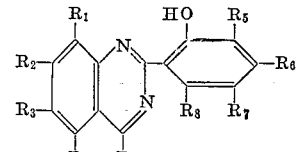

where $R_{1-4}$ are selected from hydrogen or other substituents having Hammett para sigma values in the range of $-0.67$ to $+0.78$; $R_{5-8}$ are selected from hydrogen and other substituents having Hammett para sigma values in the range of $-0.67$ to $+0.25$; and $R_9$ is hydrogen or a substituent, other than hydroxyl, having a Hammett para sigma value in the range of $-0.67$ to $+0.25$; said substituents, when other than a single hydrogen or halogen atom, being joined to the quinazoline ring through a carbon, nitrogen or oxygen atom; and, preferably, said substituents being further characterized in that $R_{1-9}$ are substantially transparent in ultraviolet light in the 300 to 400 m$\mu$ range.

$R_9$ is preferably selected from hydrogen, hydrocarbyl, substituted hydrocarbyl, amino, substituted amino, alkoxy and substituted alkoxy, where $R_{5-8}$ are as defined above.

Also included within the scope of the subject invention are photodegradation-prone substrates containing the above-defined photostabilizer compounds in amounts sufficient to retard photodegradation. Such substrates may be comprised of polyacrylonitriles, polyamides (e.g., hexamethylene adipamide or metaphenylene isophthalamide), polyolefins (e.g., polyethylene, polypropylene or polystyrene), polyvinylbutyral (especially as glass/film automotive windshield laminates), polyvinyl halides such as polyvinyl fluoride, polyacrylates or polymethacrylates (especially as automotive lacquers), and the like.

Other preferred embodiments are described in more detail below.

DETAILED DESCRIPTION OF INVENTION

Bases for the invention

This invention is based on the discovery that the 2-(o-hydroxyphenyl) quinazoline ring system has a high extinction coefficient in the near ultraviolet, is remarkably stable to such ultraviolet light, is substantially non-fluorescent, and thus has high inherent utility as a UV-screen. The 2-(o-hydroxyphenyl) quinazoline ring system may be variedly substituted in the phenyl or quinazoline nuclei, as defined, substantially without adversely affecting its inherent photostability. Thus, introducing appropriate substituents (to modify such optical properties as the extinction coefficient and specific absorptivity and such physical properties as solubility in and compatibility with polar and non-polar substances) affords a wide variety of derivatives readily adapted for use in a wide variety of substrates as UV-screens and photostabilizers.

Without limiting the invention to a particular interpretation, it is considered that photostability in general is determined by how rapidly and efficiently photo-excited UV-absorbing molecules return to their ground states before they decompose or react with their surroundings. The high photostability of the invention compounds may be explained with reference to the normal ground imino-enol State I, its somewhat higher energy amino-keto tautomeric form II, and the corresponding excited states, I* and II*. States I and II may be illustrated as:

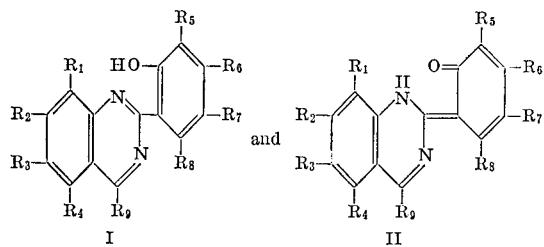

States I* and II* can only be described speculatively but are considered in theory to differ from I and II in having electrons in higher (less stable) energy levels.

In this scheme, which is summarized in Equations 1–4 below,

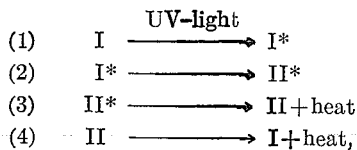

photo-excited I* dissipates its absorbed energy essentially through conversion to II*, involving energy-absorbing-electron bond shifts and atom movements accompanying such shifts, as well as through the usual bond vibrations spreading energy over the entire molecular framework. II* evidently corresponds to a relatively low-energy activated state which readily decays vibrationally with heat loss, to its ground state II, which reverts to I, by simple hydrogen and electron shifts plus heat loss to the surrounding substrate molecules.

The high photostability of the invention compounds is attributable both to the o-hydroxyaryl group at the quinazolines 2-position and to the 1,3-diazanaphthalene (or benzpyrimidine) configuration of the quinazoline ring. In support, comparative tests show that the 2-(o-hydroxyaryl)quinazolines are significantly more photostable than (a) isomeric 4-(o-hydroxyaryl)quinazolines, (b) analogously substituted pyrimidines and analogously substituted uinoxalines 1,4 - diazanaphthalenes), (c) structurally related, strongly fluorescent 2-(o-hydroxyaryl)4-(3H)-quinazolinones, and (d) such commercial UV-screens as 2-hydroxy-4-methoxybenzophenone and 2-(2-hydroxy-5-methylphenyl) benzotriazole.

Scope

The quinazolines of this invention include 2-(o-hydroxyphenyl)quinazolines; 2,4 - bis(o - hydroxyphenyl) quinazolines; 2-(o,p-dihydroxyphenyl)quinazolines and 2, 4-bis(o,p - dihydroxyphenyl)quinazolines as defined by $R_{1-9}$ above.

The benz ring of the quinazoline may carry up to 4 substituents, preferably 1 or 2 at the 6, 7 or 8 positions of the quinazoline ring. That is, $R_1$ and $R_4$ are preferably hydrogen. The 2-hydroxyphenyl ring may also carry up to 4 substituents, preferably 1 or 2 at the 4 and/or 5 positions of the o-hydroxyphenyl ring. That is, $R_5$ and $R_8$ are preferably hydrogen.

$R_{1-9}$ may vary broadly so long as they do not tend to destroy the inherent photostability of the 2-(o-hydroxyphenyl)quinazoline ring system. Photochemically suitable substituents have Hammett para sigma values in the defined ranges and are so constituted that the bonding atom is hydrogen, halogen, carbon, nitrogen or oxygen. Preferably, also, the compounds $R_{1-9}H$ corresponding to these substituents are substantially transparent to UV light within the 300 to 400mμ range, i.e., their molar extinction coefficients within this range are less than about 0.1. Substituents photoactivatable in the 300–400 (near UV) range should be avoided to minimize the possibility of side reactions leading to attack on and degradation of the substrate.

Representative suitable substituents as defined and their Hammett para sigma values in the range —.67 to +.78 are: amino (—.660), methylamino (—.59), dimethylamino (—.60), acetamido (—.015), benzamido (+.078); hydroxy (—.357), methoxy (—.268), ethoxy (—.250), propoxy (—.268), isopropoxy (—.286), butoxy (—.320), amyloxy (—.340), isooctyloxy (—.265), benzyloxy (—.415), phenoxy (—.028); methyl (—.170), ethyl (—.151), propyl (—.126), isopropyl (—.151), butyl (—.161), isobutyl (—.115), sec. butyl (—.123), tert. butyl (—.197), isoamyl (—.225), tert. amyl (—.190), chloromethyl (+.184), cyanomethyl (+.007), 2-carboxyethyl (—.066), phenyl (+.009), fluoro (+.062), chloro (+.227), bromo (+.232), cyano (+.628) and nitro (+.778). Included also are divalent substituents such as 3,4-trimethylene (—.259), 3,4-tetramethylene (—.477), 3,4-methylenedioxy (—.159) and M,P-1,4-butadienyl (+.170).

By para sigma value as used herein is meant the value obtained for the substituent in the para-position of benzoic acid and its derivatives as described and illustrated by H. H. Jaffe, Chem. Rev. 53, 191 (1953), particularly at pages 219 to 223 and column 3 of Table 7 at page 222, and by J. Hine, Physical Organic Chemistry, McGraw-Hill, N.Y., 1956, at page 72.

It is apparent from the above that all alkyl radicals have substantially similar sigma values, i.e., exert closely similar electronic effects as substituents, and that replacing one or more alkyl hydrogens with other substituents, including such strongly polar groups as halogen, cyano and carbonyl groups, affects the sigma value slightly. It should also be apparent that alkyl radicals may bear aryl or other unsaturated hydrocarbon substituents, that aryl radicals may bear alkyl substituents and that unsaturtaed hydrocarbon radicals such as alkenyl, alkadienyl and alkynyl exert effects similar to those of the other classes of hydrocarbon radicals. Likewise, it should be apparent that other alkylamino and acylamino substituents may replace those listed above, that other hydrocarbyloxy substituents may replace those listed above, and that acyloxy substituents may be employed for substantially comparable effects.

Thus it will be understood that the substituents $R_{1-9}$ include, within the defined para-sigma limits, nitro; halo with atomic number 35 or less; hydrocarbyl; amino, acylamino, hydrocarbylamino, N-acyl hydrocarbylamino; hydroxyl, acyloxy, hydrocarbyloxy; and the corresponding radicals wherein the hydrocarbyl radicals when present are substituted with such diverse groups as halo, hydroxy, oxa (ether oxygen), acyloxy, acyl, carboxy, carbalkoxy, and cyano groups, such that the substituted hydrocarbyl and substituted hydrocarbyloxy radicals have sigma values within the stated range.

Preferably $R_{1-8}$ are hydrocarbyl, hydrocarbyloxy, substituted hydrocarbyl and substituted hydrocarbyloxy as described above, halo or hydroxy, most preferably have sigma values ranging from about 0.00 (H) to about —.4, and in particular are aliphatic when they are organic groups.

$R_9$ includes $R_{1-8}$ (except for nitro and other groups having para sigma values more positive than +.23), o-hydroxyaryl groups and derivatives thereof as more fully exemplified below, and the various substituted phenyls having sigma values in the stated range. Preferably $R_9$ has a sigma value in the range —.4 to +.01, which embraces the preferred $R_{1-8}$ range and such weakly electron withdrawing groups as phenyl and other aryl radicals.

The hydrocarbyl moiety in the unsubstituted and substituted hydrocarbyl, hydrocarbyloxy and hydrocarbylamino radicals of $R_{1-9}$ may be aliphatic, cycloaliphatic or aromatic, such as alkyl, alkynyl, alkadienyl, cycloalkyl, cycloalkenyl, aryl, aralkyl and alkaryl. These may contain up to about 26 carbon atoms, more usually have up to about 18 carbons for reasons of availability and economy. The aryl moiety of the aryl, alkaryl and aralkyl substituents is normally phenyl but may be biphenylyl, naphthyl, phenanthryl and the like containing 6 to 16 carbons. Representative hydrocarbyls are, in addition to those given above, straight chain and branched chain hexyl, octyl, nonyl, decyl, dodecyl, tridecyl, hexadecyl, octadecyl; ethylenyl, propenyl, allyl, methallyl, 3-hexenyl, octadecenyl (oleyl); 2-propynyl, 2-butynyl; cyclopentenyl, 2 - methylcyclopentenyl, cyclohexenyl, 3 - cyclohexenyl; tolyl, xylyl, ethylphenyl, p-nonylphenyl, p-dodecylphenyl, benzyl, 4-chlorobenzyl, 4-methylbenzyl, 2-phenylethyl. In the various substituted hydrocarbyl and hydrocarbyloxy groups (for example, in the hydroxy-hydrocarbyl and hydroxy-hydrocarbyloxy groups) the divalent hydrocarbyl portion is preferably $C_1$–$C_4$ alkylene such as methylene, ethylene, 1,2-propylene, 1,3-propylene, 1,4-butylene and 2,3-butylene.

Representative substituted hydrocarbyls are: halohydrocarbyls such as chloromethyl, p-fluorophenyl, m-chlorophenyl; hydroxyhydrocarbyls such as hydroxyalkyls and hydroxyaryls exemplified by hydroxymethyl, 2-hydroxyethyl, 2-hydroxypropyl, 3-hydroxypropyl, 4-hydroxybutyl, 2 - hydroxy phenyl, 2 - hydroxy - 5 - methylphenyl, 2,4-dihydroxyphenyl; oxahydrocarbyls (i.e. containing etheroxygen) such as alkoxyalkyl, alkoxyphenyl and alkoxyalkyleneoxyalkyl represented by 2-methoxyethyl, p-butoxyphenyl, 2-ethoxy(ethyleneoxy)ethyl, ethoxy(polyethyleneoxy)ethyl; hydroxyoxahydrocarbyls such as hydroxy(alkyleneoxy) alkyl and hydroxy(polyalkyleneoxy)alkyl exemplified by hydroxy(ethyleneoxy)ethyl, hydroxy(1,2-propyleneoxy)isopropyloxy, hydroxy(polyethyleneoxy) ethyl; carboxy-, carbalkoxy- and cyanoalkyls such as 2-carboxyethyl, carbomethoxymethyl, carboethoxymethyl, cyanomethyl, and carboxymethyl.

Representative hydrocarbyloxy groups are in addition to those described above, allyloxy, methallyloxy, propargyloxy, decyloxy, dodecyloxy, tridecyloxy, hexadecyloxy, octadecyloxy, octadecenyloxy, benzyloxy, 2-phenylethoxy, 2-methylphenoxy. Substituted hydrocarbyloxys are exemplified by 2-hydroxyethoxy, 2-hydroxy-1-methylethoxy, 2-hydroxy-propoxy, 3-hydroxypropoxy, 4-hydroybutoxy; hydroxy(ethyleneoxy)ethoxy, hydroxy(ethyleneoxy) ethoxy, hydroxy(polyethyleneoxy)ethoy, hydroxy(1,2-propyleneoxy)isopropoxy, hydroxy(poly - 1,2 - propyleneoxy) isopropoxy; 2-hydroxyphenoxy, 4-methoxyphenoxy, 4-dodecyloxyphenoxy; 2 - carboxyethoxymethoxy, cyanomethoxy, and 2-cyanoethoxy.

The various hydroxy-substtiuted hydrocarbyl, hydrocarbyloxy, oxahydrocarbyl and oxahydrocarbyloxy radicals may be O-acylated with aliphatic or aromatic acyl groups such as acetyl and homologs, acrylyl, methacrylyl, benzoyl, methylbenzoyl, chlorobenzoyl and the like. Examples are: 2-acetoxyethyl, 2-acryloxyethyl, 2-methacryloxyethyl, acrylyloxy(ethyleneoxy) ethyl, methacryloxy(polyethyleneoxy)ethyl, and the like.

The amino and substituted amino groups include hydrocarbyl substituted hydrocarbyl- and acyl-amino groups such as methylamino, ethylamino, isooctylamino, tert. octylamino, octadecylamino, octadecenylamino, dibutylamino, methyl octylamino, cyclohexylamino, methyl cyclohexylamino, hydroxyethylamino, di-hydroxyethylamino, cyanoethylamino, piperidino, pyrrolidino, morpholino, piperazino, 4-methylpiperazino, anilino, N-methylanilino, toluidino, N-methyl toluidino- p-dimethylamino-N-methylanilino, acetamido, N-methylacetamido, benzamido, acrylamido, N-methylacrylamido, methacrylamido, and N-methylacrylamido.

In preferred subclasses $R_{1-4}$=H, alkyl, alkoxy, Cl or Br;

$R_{5-8}$=H, alkyl, hydroxy, alkoxy, hydroxyalkoxy, hydroxy(alkyleneoxy)alkoxy, hydroxy(polyalkyleneoxy) alkoxy, cyanoalkoxy, carbalkoxyalkoxy, Cl or Br; and $R_9$=H, Cl, alkyl, hydroxyalkyl, hydroxy(alkyleneoxy) alkyl, hydroxy(polyalkyleneoxy)alkyl, carboxyalkyl, carbalkoxyalkyl, cyanoalkyl, alkoxy, hydroxyalkoxy, hydroxy(alkyleneoxy)alkoxy, hydroxy(polyalkyleneoxy)alkoxy, carboxyalkoxy, carbalkoxyalkoxy, cyanoalkoxy, phenyl, chlorophenyl, alkylphenyl,

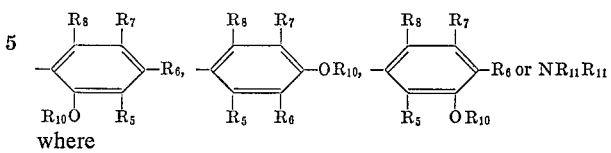

where $R_{10}$ (referred to under $R_9$)=H, alkyl, alkenyl, aralkyl, hydroxyalkyl, hydroxy(alkyleneoxy)alkyl, hydroxy(polyalkyleneoxy)alkyl, carbalkoxyalkyl, cyanoalkyl or acyl; and $R_{11}$ referred to under $R_9$=H, alkyl or aryl when taken singly or alkylene, oxalkylene or azalkylene when taken together.

Representative mono-o-hydroxyarylquinazolines are:

2-(o-hydroxyphenyl)quinazoline,
2-(o-hydroxyphenyl)-4-methylquinazoline,
2-(o-hydroxyphenyl)-4-phenylquinazoline,
2-(2-hydroxy-5-methylphenyl)quinazoline,
2-(2-hydroxy-3,5-dichlorophenyl)quinazoline
2-(2-hydroxy-5-fluorophenyl)quinazoline,
2-(2-hydroxy-5-bromophenyl)-4-butylquinazoline
2-(o-hydroxyphenyl)-6-methylquinazoline,
2-(o-hydroxyphenyl)-6,7-dimethylquinazoline,
2-(o-hydroxyphenyl)-6-chloro-4-phenylquinazoline,
2-(o-hydroxyphenyl)-6-butoxyquinazoline,
2-(o-hydroxyphenyl)-4-(o-tolyl)-6-methylquinazoline,
2-(o-hydroxyphenyl)-4-phenyl-7-chloroquinazoline,
2-(o-hydroxyphenyl)-4-nonylquinazoline,
2-(o-hydroxyphenyl)-4-heptadecylquinazoline,
2-(2-hydroxy-3-methylphenyl)-4-phenyl-6-chloroquinazoline,
2-(o-hydroxyphenyl)-4-phenyl-6-methoxyquinazoline,
2-(o-hydroxyphenyl)-4-phenyl-7-methoxyquinazoline,
2-(o-hydroxyphenyl)-4-phenyl-6,7-dimethoxyquinazoline,
2-(o-hydroxyphenyl)-4-phenyl-8-methoxyquinazoline,
2-(o,p-dihydroxyphenyl)quinazoline,
2-(o,p-dihydroxyphenyl)-4-ethylquinazoline,
2-(o-hydroxy-p-methoxyphenyl)quinazoline,
2-(o-hydroxy-p-octyloxyphenyl)quinazoline,
2-[o-hydroxy-p-(2-hydroxyethoxy)phenyl]quinazoline,
2-[o-hydroxy-p-(hydroxy-tetra-beta-ethyleneoxy-beta-ethoxy)phenyl]quinazoline,
2-(o-hydroxyphenyl)-4-chloroquinazoline,
2-(o-hydroxyphenyl)-4-bromoquinazoline,
2-(o-hydroxyphenyl)-4-aminoquinazoline,
2-(o-hydroxyphenyl)-4-dimethylaminoquinazoline,
2-(o-hydroxyphenyl)-4-butylaminoquinazoline,
2-(o-hydroxyphenyl)-4-piperidinoquinazoline,
2-(o-hydroxyphenyl)-4-morpholinoquinazoline,
2-(o-hydroxyphenyl)-4-bis(2-cyanoethyl) aminoquinazoline,
2-(o-hydroxyphenyl)-4-[N-methyl-2-(N-methyl-methacrylamido)ethylamino]quinazoline,
2-(o-hydroxyphenyl)-4-acetamidoquinazoline,
2-(o-hydroxyphenyl)-4-acrylamidoquinazoline,
2-(o-hydroxyphenyl)-4-methoxyquinazoline,
2-(2-hydroxy-5-methylphenyl)-4-ethoxyquinazoline,
2-(2-hydroxy-5-methylphenyl)-4-butoxyquinazoline,
2-(2-hydroxy-5-methylphenyl)-4-tridecyloxyquinazoline,
2-(o-hydroxyphenyl)-4-lauryloxyquinazoline,
2-(o-hydroxyphenyl)-4-octadecyloxyquinazoline,
2-(o-hydroxyphenyl)-4-[2-hydroxyethoxy]quinazoline,
2-(o-hydroxyphenyl)-4-[2-dimethylaminoethoxy] quinazoline,
2-(o-hydroxyphenyl)-4-phenoxyquinazoline,
2-(o-hydroxyphenyl)-4-[p-cresyloxy]quinazoline,
2-(o-hydroxyphenyl)-4-[p-chlorophenoxy]quinazoline,
2-(o-hydroxyphenyl)-4-(2-beta-acryloxyethyl) quinazoline,
2-(o-hydroxyphenyl)-4-chloromethylquinazoline,
2-(o-hydroxyphenyl)-4-hydroxymethylquinazoline, 2-(o-hydroxyphenyl)-4-hydroxyethylquinazoline,
2-(o-hydroxyphenyl)-4-cyanomethylquinazoline,
2-(o-hydroxymethyl)-4-carboxymethylquinazoline,
2-(2-hydroxy-4-aminophenyl)quinazoline,
2-(2-hydroxy-5-dimethylaminophenyl)quinazoline,
2-(o-hydroxyphenyl)-7-dimethylaminoquinazoline,
2-(2-hydroxy-5-chlorophenyl)quinazoline,
2-(o-hydroxyphenyl)-4-chloro-7-nitroquinazoline,
2-(2-hydroxy-5-chlorophenyl)-4,7-dichloroquinazoline,
2-(o-hydroxyphenyl)-4-dimethylamino-7-chloro-quinazoline and
2-(o-hydroxyphenyl)-4-dimethylamino-7-nitro-quinazoline.

Representative di-o-hydroxyarylquinazolines and derivatives are:

2,4-bis(o-hydroxyphenyl)quinazoline,
2,4-bis(o-hydroxy-5-methylphenyl)quinazoline,
2,4-bis(o,p-dihydroxyphenyl)quinazoline,
2,4-bis(o,p-dihydroxyphenyl)-7-methylquinazoline,
2,4-bis(o,p-dihydroxyphenyl)-6,7-dimethylquinazoline,
2,4-bis(o,p-dihydroxyphenyl)-7-chloroquinazoline,
2,4-bis(o,p-dihydroxyphenyl)-7-methoxyquinazoline,
2,4-bis(2,4-dihydroxy-5-methylphenyl)quinazoline,
2,4-bis(2,4-dihydroxy-3,5-dichlorophenyl)quinazoline,
2,4-bis(2,4-dihydroxy-3,5-dibromophenyl)quinazoline,
2,4-bis(o-hydroxy-p-methoxyphenyl)quinazoline,
2-(o-hydroxy-p-methoxyphenyl)-4-(o,p-dimethoxyphenyl)quinazoline,
2,4-bis(o-hydroxy-p-propoxyphenyl)quinazoline,
2-(o-hydroxyphenyl)-4-(o-methoxyphenyl)quinazoline,
2-(o-hydroxyphenyl)-4-(p-methoxyphenyl)quinazoline,
2-(o-hydroxyphenyl)-4-(3,4-dimethoxyphenyl)quinazoline,
2-(o-hydroxyphenyl)-4-(2,4-dimethoxyphenyl)quinazoline,
2-(o-hydroxy-p-propoxyphenyl)-4-(o,p-dipropoxyphenyl)quinazoline,
2-(o-hydroxy-p-butoxyphenyl)-4-(o,p-dihydroxyphenyl)quinazoline,
2-(o,p-dihydroxyphenyl)-4-(o-hydroxy-p-butoxyphenyl)quinazoline,
2,4-bis(o-hydroxy-p-butoxyphenyl)quinazoline,
2,4-bis(o-hydroxy-p-octyloxyphenyl)quinazoline,
2,4-bis(o-hydroxy-p-dodecyloxyphenyl)quinazoline,
2,4-bis(o-hydroxy-p-octadecyloxyphenyl)quinazoline,
2,4-bis(o-hydroxy-p-allyloxyphenyl)quinazoline,
2,4-bis(o-hydroxy-p-octadecenyloxyphenyl)quinazoline,
2,4-bis(o-hydroxy-p-benzyloxyphenyl)quinazoline,
2-[o-hydroxy-p-(carbethoxymethoxy)phenyl]-4-(o,p-dicarbethoxymethoxyphenyl)quinazoline,
2-[o-hydroxy-p-(beta-hydroxyethyloxy)phenyl]-4-[o,p-bis(beta-hydroxyethyloxy)phenyl]quinazoline,
2,4-bis[o-hydroxy-p-(beta-acryloxyethyloxy)phenyl]quinazoline,
2,4-bis[o-hydroxy-p-(beta-methacryloxyethoxy)phenyl]quinazoline,
2,4-bis(o,p-dihydroxyphenyl)-7-nitroquinazoline,
2,4-bis(o,p-dihydroxyphenyl)-7-aminoquinazoline,
2,4-bis(o,p-dihydroxyphenyl)-7-dibutylaminoquinazoline and
2,4-bis(o,p-dihydroxyphenyl)-7-acetamidoquinazoline.

Preparation

The hydroxyarylquinazolines may be prepared by a variety of general methods, A–F, below:

(A) An o-salicylamino-phenoic compound is ring-closed with ammonia, usually in alcohol at 100–200° C. under autogenous pressure, as disclosed by Bogert et al., JACS 49, 2650 (1927), and illustrated in the examples below, to produce the corresponding 2-hydroxyaryl-4-quinazoline,

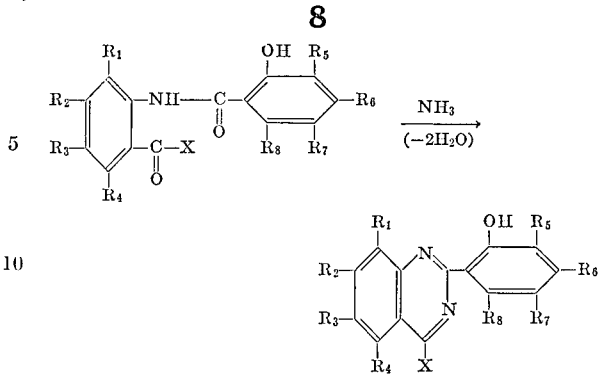

where $R_{1-8}$ are as defined above (halo, nitro, hydrocarbyl, hydrocarbyloxy) and X includes $R_9$ (as defined above, but generally is H or hydrocarbyl), carboxyl and derivatives hydrolyzable to carboxyl, e.g. carbonamido, carbalkoxy.

Typical o-salicylamino-phenonic compounds that may be utilized are:

o-salicylaminoacetophenone
2-salicylamino-5-chlorocetophenone
2-salicylamino-4,5-dimethyl-acetophenone
2-salicylamino-5-nitro-acetophenone
o-salicylaminobenzophenone
o-salicylaminobenzaldehyde
o-salicylamino-isatinic acid
o-[2-hydroxy-5-methylbenzoylamino]propiophenone
o-[2-hydroxy-5-methoxybenzoylamino]butyrophenone
o-[2-hydroxy-5-chlorobenzoylamino]benzophenone They may be conveniently prepared from the appropriately substituted salicyl chlorides and o-amino phenyl carbonyl compounds.

When $X=CO_2H$ as in the isatinic acids the resulting quinazoline-4-carboxylic acid is decarboxylated, as by heating in quinoline, to yield the 2-o-hydroxyarylquinazoline of the invention where $R_9=H$.

A variation on this method utilizes salicyl compounds as above but wherein the salicyl's hydroxyl group is protected with a readily removable blocking group (e.g. methyl as in 2(o-methoxybenzoylamino)benzaldehyde) and the resulting ring-closed product (e.g. 2-(o-methoxyphenyl)-quinazoline) is treated to remove the blocking group (e.g. demethylated with acid).

In a similar variant an N-(o-hydroxy or acyloxy) aroyl isatin is ammonated, the intermediate 2-(o-hydroxyaryl) quinazoline-4-carboxamide saponified and the resulting 4-carboxylic acid decarboxylated as above.

(B) A 2,4-dichloroquinazoline, such as 2,4-dichloroquinazoline, 2,4-dichloro-7-methylquinazoline, 2,4-dichloro-6,7-dimethylquinazoline, 2,4-dichloro-6-butylquinazoline, 2,4-dichloro-6-butoxyquinazoline, 2,4,6-trichloroquinazoline, 2,4-dichloro-7-fluoroquinazoline, 2,4-dichloro-7-bromoquinazoline, is condensed with a hydroxyarene which is unsubstituted at a position ortho to the hydroxy group and preferably is substituted at the position para to the hydroxy group, such as phenol, p-methylphenol, p-butylphenol, p-allylphenol, 3,4-dimethylphenol, p-nonylphenol, p-methoxyphenol, p-butoxyphenol, 1,3-dihydroxybenzene (resorcinol), 1,4-hydroquinone, 1,3,4-trihydroxybenzene or mixtures thereof in the presence of aluminum chloride or other Friedel-Crafts catalyst, as illustrated in the examples,

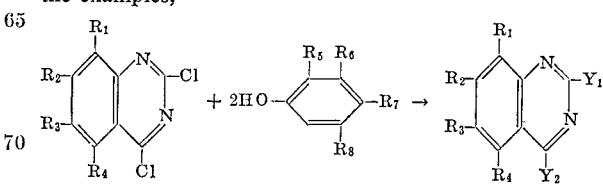

where $R_{1-8}$ are as defined previously, $Y_1$ and $Y_2$ are o-hydroxyaryl radicals formed by removing a hydrogen ortho to the hydroxy group.

In a variation on this method, a 2-(o-hydroxyaryl)-4-chloroquinazoline is condensed with a mono- or polyhydric phenol as described above to yield a 2,4-bis(o-hydroxyaryl)quinazoline where the two o-hydroxyaryl groups (i.e. $Y_1$ and $Y_2$ in the above reaction) may be the same or different.

The 2 - (o - hydroxyaryl) - 4 - chloroquinazolines are obtainable from the corresponding 2-(o-hydroxyaryl)-4(3H)-quinazolinones on treatment with phosgene/dimethylformamide as illustrated in the examples. The quinazolinones may be prepared as described in U.S. Pat. No. 3,169,129, by ring-closing 2-(o-hydroxyaryl) anthranilamides in alkali. Typical quinazolinones which may be used in the methods under B and under methods C and D below for the preparation of 4-hydrocarbyloxy and 4-amino type quinazolines are:

2-(o-hydroxyphenyl)-4(3H)-quinazolinone
2-(o-hydroxyphenyl)-6-nitro-4(3H)-quinazolinone
2-(o-hydroxyphenyl)-6-chloro-4(3H)-quinazolinone
2-(2-hydroxy-5-chlorophenyl)-4(3H)-quinazolinone
2-(2-hydroxy-5-methylphenyl)-6-methoxy-4(3H)-quinazolinone (C) 2-(o-hydroxyaryl)quinazolines containing a 4-amino or substituted amino group are prepared either by reacting the 2-(o-hydroxyaryl)-4(3H)-quinazolinones with ammonia, as illustrated in the examples for the preparation of 2-(o-hydroxyphenyl)-4-aminoquinazoline, or by reacting the corresponding 4-chloro or bromoquinazolines (obtainable from the quinazolinones as described above) with ammonia or an amine as defined previously, e.g. Me$_2$NH, as shown in the examples for the preparation of 2-(o-hydroxyphenyl)-4-dimethylaminoquinazoline.

The 2-(o-hydroxyaryl)-4(3H)-quinazolinones and the 4-halo compounds derived therefrom may vary widely as to the $R_{1-8}$ substituents, in accordance with the above disclosure. Suitable amine reactants are methylamine, methyl ethylamine, methyloctylamine, dibutylamine, pyrrolidine, piperidine, N-methylpiperazine, ethanolamine, diethanolamine, 3-dimethylaminopropylamine, morpholine, aniline, N-methylaniline, N-methyl-p-toluidine and the like.

(D) 2-(o-hydroxyaryl)quinazolines containing a 4-hydrocarbyloxy or substituted hydrocarbyloxy group are prepared by (1) alkylating 2-(o-hydroxyaryl)-4(3H)-quazolinones with (a) diazo compounds such as diazomethane, methyl diazoacetate and their homologs or (b) alkyl halides such as methyliodide, allyl bromide, octadecyliodide and the like in the presence of an acid binding agent, as illustrated in the examples, or (2) reacting the corresponding 2 - (o - hydroxyaryl) - 4 - chloro(or bromo)quinazoline with a metal hydrocarbylate such as an alkali metal methylate, tridecylate, octadecylate, beta-hydroxyethylate, phenylate, cresylate, or p-chlorophenylate.

(E) 2 - (o - hydroxyaryl)quinazolines and 2,4 - bis(o-hydroxyaryl)quinazolines, prepared by any of the above methods and bearing $R_{1-9}$ substituents that are chemically reactive, particularly $R_{5-9}$, and particularly OH, hydroxyalkyl, amino, alkylamino, and the like groups having replaceable hydrogen be subsequently treated to introduce O- and N-substituents as for example, by well-known alkylation and acylation techniques, to provide still other derivatives of this invention, valuable as UV-screens.

This method is based on the discovery that the o-hydroxy group of the 2-aryl ring (critical for photostability) is far less reactive towards alkylation and acylation than other hydroxy and amino groups bearing replaceable hydrogen, evidently because the o-hydroxy group is strongly hydrogen-bonded to quinazoline ring nitrogen. Thus, through control of molar proportions and other reaction conditions, as will be appreciated by those skilled in the art, it is possible to selectively alkylate and acylate the other groups, substantially without affecting the o-hydroxy group.

The terms alkylating and acylating agents are used in the generic sense. The alkylating agents include aliphatic diazo compounds, such as diazomethane, methyl diazoacetate, and their homologs; hydrocarbyl esters of inorganic and organic esters, wherein the hydrocarbyl radical is attached to a leaving group, such as halide, sulfate, phosphate, carboxylate, and sulfonate, through a saturated carbon atom as in methyl, allyl, benzyl, and the like groups; substituted hydrocarbyl esters as above containing substituents described under $R_{1-9}$ such as halo, hydroxy, oxa, carboxy, carbalkoxy and cyano; cyclic hydrocarbyl esters, such as beta-lactones and epoxides, wherein the leaving group is divalent and attached both to saturated carbon of the hydrocarbyl moiety and to another portion of the molecule. The acylating agents include carbonyl halides, sulfonyl halides, carbamoyl halides, isocyanates, carbodiimides and the like, which may carry other substituents as disclosed above for the substituted hydrocarbyl radicals.

Thus as illustrated in the examples there may be used such typical and commonly available agents as methylbromide, octadecyl bromide, B-chloroethanol, ethylene oxide, methyl bromoacetate and ethyl bromoacetate. Still others that may be used are dimethyl sulfate, methyl trifluoroacetate, ethyl p-toluenesulfonate, allyl chloride, methallyl chloride, benzyl chloride, 1,2-propyleneoxide, 3-iodopropanol, 4-chloro-2-butenol, propiolactone, acetyl chloride, benzoyl chloride, acrylyl chloride and methacrylyl chloride.

In short, the organic substituents introduced via such alkylating or acylating agents may vary broadly provided that said substituents are substantially transparent to light wavelengths between 300 and 400 m$\mu$.

(F) As will be appreciated by those skilled in the art, the hydroxyl in the hydroxyaryl rings of the quinazolines activates the phenyl ring towards direct electrophilic substitution, such as halogenation, alkylation, nitration. Similarly other electropositive substituents in the hydroxyaryl ring, e.g. alkyl, alkoxy, other hydroxy, further facilitates such electrophilic substitutions. Thus such typical quinazolines of this invention as 2-hydroxyphenylquinazoline, 2,4-bis(2-hydroxy - 5 - methylphenyl)quinazoline, 2,4-bis(o,p-dihydrophenyl)quinazoline, 2,4-bis(o-hydroxy-p-propoxyphenyl)quinazoline, and 2-(o-hydroxy-p-methoxyphenyl)-4-(o,p-dimethoxyphenyl)quinazoline may be directly chlorinated and brominated in one or more of the hydroxyphenyl rings at one or more positions o- and p- to the hydroxy and alkoxy substituents, depending on the molar proportions of the halogenating agent, about one mole being required for each halogen to be introduced.

Thus these may be prepared from the above exemplifying compounds 2-(2-hydroxy-3 or 5-chlorophenyl)quinazoline, 2-(2-hydroxy-3,5-dichlorophenyl)quinazoline, 2-(2 - hydroxy - 5 - bromophenyl)quinazoline, 2,4-bis(2-hydroxy-3-chloro - 5 - methylphenyl)quinazoline, 2,4-bis(2,4 - dihydroxy-3,5-dichlorophenyl)quinazoline, 2,4-bis(2-hydroxy - 4 - propoxy-5-bromophenyl)quinazoline, and 2-(2-hydroxy - 4 - methoxy-5-chlorophenyl)-4-(2,4-dimethoxy-5-chlorophenyl)quinazoline.

Similarly, the hydroxyaryl rings may be directly alkylated under mild Friedel-Crafts conditions with such typical alkyl sources as alcohols and olefins in the presence of a strong acid. For example, from isobutylene and 2-(o-hydroxyphenyl)quinazoline in the presence of p-toluenesulfonic acid there may be obtained directly 2-(o-hydroxy-p-tert. butylphenyl)quinazoline and higher alkylated products, arising from partial polymerization of the olefin prior to alkylation, such as 2-(o-hydroxy-5-tert. octylphenyl)quinazoline, and 2-(o-hydroxy-p-tert. dodecylphenyl)quinazoline. Similarly from isoamylene and 2,4-bis(o,p-dihydroxyphenyl)quinazoline there may be obtained 2,4-bis(2,4-dihydroxy-5-tert. amylphenyl)quinazoline; and from diisobutylene or tetrapropylene and 2,4- bis(o,p-dihydroxyphenyl)quinazoline there may be obtained 2,4 - bis(2,4-dihydroxy-5-octylphenyl)quinazoline and 2,4 - bis(2,4-dihydroxy-5-tridecylphenyl)quinazoline, respectively.

The 2(o-hydroxyaryl)quinazolines may also be nitrated directly, for example with nitric-sulfuric acid or other nitrating agents to yield such nitro derivatives as 2(2-hydroxy - 5 - nitrophenyl)quinazoline and 2,4-bis(2,4-dihydroxy-5-nitrophenyl)quinazoline. The nitro derivatives may be reduced according to known methods to the corresponding amines, which may be further substituted as desired, by reaction with alkylating and/or acylating agents as described above, to yield the corresponding N-substituted amino derivatives in accordance with this invention.

Utility

As stated above, the hydroxyarylquinazolines of this invention are UV-absorbers that rapidly and efficiently dissipate such normally destructive energy through non-degradative processes. They are thus useful as light screens and photostabilizers in or on liquid or solid organic materials normally prone to deteriorate in unfiltered sunlight or other light containing UV components. One important substrate class includes resinous and polymeric materials which may be natural or synthetic, as films, sheets, fibers, textiles or other forms presenting a surface subject to light exposure, in particular cellulosics such as cellulose acetate and cellophane, condensation polymers such as polyamides (nylon type), polyacetals (polyvinyl butyral resins), polyesters (e.g., "Mylar" polyester film), and polyurethanes and addition polymers and copolymers of ethylene, propylene, butadiene, chloroprene, styrene, acrylonitrile, vinyl chloride, vinyl fluoride, vinylidene fluoride, alkyl acrylate, alkyl methacrylate and mixtures thereof.

The UV-sensitive materials to be protected may be contained within or located under UV-transparent materials, which themselves may or may not be prone to photodegradation. For example, dyes and pigments in polyolefins, poly acrylates and poly acetals, may thus be protected by incorporating therewith hydroxyaryl quinazolines. Similarly the light fastness of dyes and pigments which have been melt-incorporated into or applied on fibers, e.g. polyamides, can also be improved in this way. The hydroxyaryl quinazolines may likewise be melt-incorporated into the fiber during its manufacture or co-applied with the dye in the textile finishing mill dyeing step.

Light-sensitive commodities like cosmetics or foods, e.g. milk, beer, potato chips, luncheon meats, bacon and other meats, dried fruits, frozen peas, beans and other vegetables, may be protected against discoloration, vitamin deterioration and light-catalyzed oxidative degradations by packaging these products in film packaging materials, e.g. polyolefins and cellophanes, containing hydroxyaryl quinazolines either as part of the film composition or coated thereon to screen out the harmful rays.

Outdoor paints, coatings or other surfaces may also be protected against photodegradation by incorporating therewith or overcoating with films or other coatings containing hydroxyaryl quinazoline light screeners. Thus pigmented building sidings coated with protective polyvinyl fluoride films containing light screeners of this invention are exceptionally stable to weathering and the effects of light. The light screeners may also be used in clear wood coatings, such as oil modified polyurethane, tung-oil phenolic spar varnish, exterior alkyds and nitrocellulose coatings, to protect both the coating and the wood from darkening and deteriorating.

Adhesives and other bonding agents used in outdoor applications (for example acrylic, epoxy and polyester adhesive resins described and referred to by Tocker in U.S. Pat. No. 3,265,760) and prone to light degradation can likewise be protected by the UV screeners of this invention.

In a particular use embodiment the hydroxyaryl quinazolines of this invention are incorporated as UV screens in acrylic coating compositions, particularly useful as automotive lacquers. Desirable coating compositions broadly comprise (A) from 5 to 95 parts by weight of at least one polymer which is either (1) a poly (C$_1$C$_3$alkyl methacrylate) or (2) a poly(C$_1$–C$_{20}$alkyl acrylate), a poly(C$_2$–C$_{18}$alkyl methacrylate), polystyrene or a mixture thereof and (B) from 95 to 5 parts by weight of at least one copolymer of methyl methacrylate with a C$_1$–C$_{10}$alkyl acrylate, a C$_4$–C$_{18}$alkyl methacrylate or a mixture thereof, components (A) and (B) having glass transition temperatures which differ from each other by at least 30° C. The coating composition is normally carried in a carrier solvent and may contain other desirable and compatible automotive lacquer components such as plasticizers, pigments and a binder such as cellulose acetate butyrate. A typical lacquer comprises (A) at least 30%, by weight of the film-forming A and B components combined, of poly (methyl methacrylate) having a 1.10–1.25 relative viscosity (0.5% solution in ethylene dichloride), (B) at least 30%, by weight of A and B combined, of a methyl methacrylate/butyl acrylate 82/18 copolymer having a 1.10–1.25 relative viscosity, and (C) up to 20%, by weight of the solids in the composition of a compatible plasticizer, such as dibutyl phthalate, bis-(methylcyclohexyl)phthalate, butyl benzyl phthalate, tributyl phthalate, polyester plasticizers and alkyd resins. Such coating compositions are more fully described by W. S. Zimmt, South African appln. 6957/67 and U.S. appln. Ser. No. 588,699, filed Oct. 24, 1966, which disclosure is incorporated herein by reference.

The hydroxyaryl quinazolines are also useful as intermediates for the preparation of still further substituted hydroxyaryl quinazoline photostabilizers. For example the 4-chloro- and 4-bromo-2-(o-hydroxyaryl)quinazolines are useful in the preparation of the corresponding 4-amino and substituted aminoquinazolines. Also, monomeric quinazolines such as 2,4-bis[o-hydroxy-p-(beta-acryloxyethyloxy)phenyl]quinazoline and similar compounds described above containing ethylenically unsaturated, polymerizable groups, may be converted to polymers wherein the quinazoline photostabilizer moiety is appended to the main polymer chain.

The concentration of the photostabilizer in the substrate will normally vary with the particular stabilizer and its effectiveness, the substrate to be protected and its susceptibility to photodegradation and the effect desired. It is usually desirable to employ sufficient of the stabilizer to screen substantially all the potentially harmful radiation. In general, concentrations providing optical densities of from 1 to 2 correspond to 90% or more absorption of the incident light. Typical amounts for screening 90% or more of the light are from .05 to 5% by weight based on the substrate.

The hydroxyaryl quinazolines may also be advantageously employed with other additives normally employed to protect the various particular substrates described above against oxidative, thermal and other degradative processes. Included among such co-additives are phenolic antioxidants, salicylate thermal stabilizers, triaryl phosphoramides, nickel alkyl carbamates, nickel phenolates and dilauryl thiodipropionate. They may also be used with pigments, fillers, plasticizers and other light absorbers if desired as long as these additives do not detract from their effectiveness for the purposes of this invention.

PREPARATION EXAMPLES

The following examples are intended to be merely illustrative of the invention and not in limitation thereof. More particularly, these examples illustrate the various methods of preparation of variedly substituted hydroxyarylquinazolines falling within the scope of the subject invention. All parts are by weight unless otherwise indicated.

EXAMPLE 1

Preparation of 2-(o-hydroxyphenyl)-quinazoline (A) 2-(o-hydroxyphenyl)-quinazoline-4-carboxylic acid (3.06 g., prepared as described by Bogert and McColm, J. Am. Chem. Soc. 49, 2650 (1927)) was decarboxylated by heating in quinoline (25 ml.) at 160° C. for 3 hours. The quinoline was removed under reduced pressure, at temperatures up to 100° C., and the residue was crystallized from ethanol to give the pale yellow product, M.P. 132–133° C.

Calculated for $C_{14}H_{10}N_2O$ (percent): C, 75.66; H, 4.54; N, 12.61; O, 7.20. Found (percent): C, 75.65; H, 4.60; N, 12.61; O, 7.28.

(B) The above 4-carboxylic intermediate is also conveniently obtained by reacting acetyl salicylic acid with thionyl chloride and pyridine in petroleum ether, condensing the resulting o-acetoxybenzoyl chloride with isatin sodium salt to give N-(o-acetoxybenzoyl)-isatin, heating the isatin derivative with ammonia in ethanol at 150° C for 5 hours to form 2-(o-hydroxyphenyl)-quinazoline-4-carboxamide, saponifying the carboxamide with boiling aqueous-ethanolic sodium hydroxide, acidifying with HCl, and filtering.

(C) Alternatively 2-(o-hydroxyphenyl)quinazoline is prepared by acylating o-aminobenzaldehyde with o-methoxybenzoyl chloride in pyridine, condensing the resulting o-(o-methoxybenzoylamino)benzaldehyde (3.28 g.); M.P. 93–95° C., with anhydrous $NH_3$ (5 ml.) in ethanol (25 ml.) in a sealed tube at 161° C. for 16 hours, to yield, after evaporating the solvent, 2-(o-methoxyphenyl)quinazoline (M.P. 89–90° C., recrystallized from cyclohexane), and demethylating the o-methoxy compound either with $BCl_3$ (5-fold molar excess) in methylene chloride at 0–5° C. for 2 hour, or with $AlCl_3$ in boiling toluene for 4–5 hours.

EXAMPLE 2

2-(o-hydroxyphenyl)-4-methylquinoazoline o-Salicylaminoacetophenone (1.93 g., M.P. 134–135° C., prepared as described in J. Am. Chem. Soc., 49, 2650 (1927)) was heated with approximately 8 g. of anhydrous ammonia and 50 ml. of absolute ethanol in a 100 ml. stainless steel autoclave at 180° C. for 24 hours. The reaction mixture was concentrated at reduced pressures at temperatures up to 50° C. to a volume of about 15 ml. and filtered. The filter cake was sublimed at 118° C. and 0.025 mm. Hg pressure, and recrystallized from ethanol, to give 2-(o-hydroxyphenyl)-4-methylquinazoline, M.P. 118–119° C.

Calculated for $C_{15}H_{12}N_2O$ (percent): C, 76.25; H, 5.12; N, 11.86. Found (percent): C, 76.35; H, 5.03; N, 11.92.

EXAMPLE 3

2-(o-hydroxyphenyl)-4-phenylquinazoline o-Salicylaminobenzophenone (5.14 g., M.P. 140–141° C., prepared from salicyl chloride and o-aminobenzophenone) was heated with 12 g. of anhydrous ammonia and 150 ml. of absolute ethanol in a 250 ml. stainless steel autoclave at 180° C. for 24 hours. The reaction mixture was cooled to about 0° C. and filtered. The collected solid was sublimed at 170° C. and 0.02 mm. Hg, and recrystallized from a mixture of 2.5 parts ethanol and 1 part benzene, to yield the product, M.P. 171–172° C.

Calculated for $C_{20}H_{14}N_2O$ (percent): C, 80.52; H, 4.73; N, 9.39; O, 5.36. Found (percent): C, 80.59; H, 4.57; N, 9.59; O, 5.41.

The o-salicylamino phenonic compounds of Examples 1C, 2 and 3 may be replaced with analogous compounds and ring closed by the above procedures to the corresponding 2(o-hydroxyaryl)quinazolines as tabulated below.

| Phenonic Compound | Quinazoline |
| --- | --- |
| 2-salicylamino-5-chloroacetophenone. | 2-(o-hydroxyphenyl)-4-methyl-6-chloro-. |
| 2-salicylaminophenylnonylketone. | 2-(o-hydroxyphenyl)-4-nonyl-. |
| 2-salicylamino-4,5-dimethylacetophenone. | 2-(o-hydroxyphenyl)-4,6,7-trimethyl-. |
| 2-salicylaminophenylheptadecylketone. | 2-(o-hydroxyphenyl)-4-heptadecyl-. |
| 2-salicylamino-5-chlorobenzophenone. | 2-(o-hydroxyphenyl)-4-phenyl-6-chloro-. |
| o-(o-Methoxybenzoylamino)3,4,5,6-tetramethyl-benzaldehyde. | 2-(o-hydroxyphenyl)-5,6,7,8-tetramethyl-. |
| 2-salicylamino-5-nitro acetophenone. | 2-(o-hydroxyphenyl)-4-methyl-6-nitro-. |
| 2-(2-hydroxy-5-methylbenzoylamino)propiophenone. | 2-(2-hydroxy-5-methylphenyl)-4-ethyl-. |
| 2-(2-hydroxy-3-methoxybenzoylamino)acetophenone. | 2-(2-hydroxy-3-methoxyphenyl)-4-methyl-. |
| 2-(o,p-dihydroxybenzoylamino)acetophenone. | 2-(o,p-dihydroxyphenyl)-4-methyl-. |
| 2-(2-hydroxy-5-methoxyphenyl)butyrophenone. | 2-(2-hydroxy-5-methoxyphenyl)-4-propyl-. |
| 2-(2,4,6-trihydroxybenzoylamino)acetophenone. | 2-(o,o,p-trihydroxyphenyl)-4-methyl-. |
| o-Salicylaminophenyl(p-methoxyphenyl)ketone. | 2-(o-hydroxyphenyl)-4-(p-methoxyphenyl)-. |

EXAMPLE 4

2,4-bis(2-hydroxy-5-methylphenyl)-quinazoline (A) 2,4-dichloroquinazoline (6 g., 0.06 mole; prepared by the methods described in J. Am. Chem. Soc. 41, 2052 (1919) and Ber. 38, 3561 (1905)), p-methylanisole (7.4 g.) and $AlCl_3$ (8 g.) were heated in a dichlorobenzene (50 ml.) at 176–182° C. for 19 hours. The solvent was then evaporated, the residue mixed with dilute HCl and ice and the resulting aqueous layer decanted. The product was triturated with ether, collected by filtration and recrystallized from toluene; M.P. 202–204° C.

Calculated for $C_{22}H_{18}N_2O_2$ (percent): C, 77.17; H, 5.30; N, 8.18. Found (percent): C, 77.14; H, 5.49; N, 8.50.

(B) Essentially the same product is obtained starting with p-cresol as follows: $AlCl_3$ (86.7 g.) is slowly added to a 0° C. solution of 2,4-dichloroquinazoline (60 g.) and p-cresol (64.8 g.) in o-dichlorobenzene (1 liter), keeping the temperature at 0–10° C. during the 10–15 min. required for the addition. The mixture is heated at 140° C. with stirring for 20 hours, then cooled, poured into dilute aqueous HCl, filtered, and the solid product recrystallized from ethanol.

The NMR spectrum of this product indicates that the groups at the 2-position of the quinazoline ring is 2-hydroxy-5-methylphenyl. The IR spectrum indicates there are 2 phenolic hydrogens, one externally hydrogen-bonded, the other relatively free. While the structure is considered to be that described above, it is conceivable that this product contains or is the isomeric structure 2(2-hydroxy - 5 - methylphenyl)-4-(2-methyl-5-hydroxyphenyl)quinazoline.

EXAMPLE 5

2,4-bis(o,p-dihydroxyphenyl)-quinazoline 2,4-dichloroquinazoline (12.0 g., 0.06 mole), resorcinol (15.4 g., 0.14 mole), anhydrous aluminum chloride (20.6 g., 0.154 mole), and nitrobenzene (150 g.) were heated at 65–75° C. for 30 min., then 75–80° C. for 150 min. The reaction mixture was cooled to room temperature and poured into a stirred mixture of 300 ml. conc. hydrochloric acid, 300 ml. $H_2O$, and 80 g. ice. The aqueous layer was decanted, and the mixture again extracted with fresh water. The organic phase was added to an excess of cold aqueous sodium hydroxide (40 g. NaOH in 300 ml. $H_2O$) sufficient to dissolve the quinazoline and extracted with benzene to remove the nitrobenzene. The aqueous layer was acidified with an excess of cold dilute hydrochloric acid. The thus precipitated product was filtered, washed with water, and dried in vacuo at room temperature. The crude product (2.11 g.) was further purified by dissolving it in boiling dioxane (350 ml.), filtering to remove a small amount of insoluble particles and adding benzene (700 ml.) to the hot solution, which was allowed to cool, to obtain crystalline product, M.P. 288–290° C. Chromatographing on a silicic acid column and eluting with 15% ethanol in benzene gave 2,4-bis(o,p-dihydroxyphenyl)-quinazoline, M.P. 290–292° C.

Calculated for $C_{20}H_{14}N_2O_4$ (percent): C, 69.36; H, 4.07; N, 8.09. Found (percent): C, 68.85; H, 4.43; N, 8.00.

EXAMPLE 6

7-methyl-2,4-bis(o,p-dihydroxyphenyl)-quinazoline 7-methyl-2,4-dichloroquinazoline (12.8 g., 0.06 mole, M.P. 112–113° C., prepared from $PCl_5$ and 7-methyl-2,4-dioxyquinazoline, M.P. 327–328° C., utilizing the methods described in J. Am. Chem. Soc. 41, 2052 (1919) and Ber. 38, 3561 (1905)), resorcinol (15.4 g., 0.14 mole), and anhydrous aluminum chloride (20.6 g., 0.154 mole) were heated in nitrobenzene (200 ml.) and the reaction was worked up substantially as described in Example 4, to obtain 7-methyl-2,4-bis(o,p-dihydroxyphenyl)quinazoline, M.P. 290–292° C.

Calculated for $C_{21}H_{16}N_2O_4$ (percent): C, 69.99; H, 4.48; N, 7.77. Found (percent): C, 69.52; H, 5.22; N, 7.18.

The procedures of Examples 4, 5 and 6 may also be used to prepare the following 2(o-hydroxyaryl)quinazolines from reactants as tabulated below:

| Starting chloroquinazoline | Hydroxyarene | Quinazoline product |
|---|---|---|
| 2,4-dichloro- | p-Nonylphenol | 2,4-bis(2-hydroxy-4-nonylphenol)-. |
| 2,4-dichloro-6,7-dimethyl- | Resorcinol | 2,4-bis(o-p-dihydroxyphenyl)-6,7-dimethyl-. |
| 2,4-dichloro-6-butyl- | 1,3,4-trihydroxybenzene | 2,4-bis(2,4,5-trihydroxyphenyl)-6-butyl-. |
| 2,4-dichloro-6-butoxy- | Resorcinol | 2,4-bis(o,p-dihydroxyphenyl)-6-butoxy-. |
| 2,4,6-trichloro- | do | 2,4-bis(o,p-dihydroxyphenyl)-6-chloro-. |
| 2,4-dichloro- | 3,5-dimethyl phenol. | 2,4-bis(2-hydroxy-4,6-dimethylphenyl)-. |
| 2,4-dichloro-7-fluoro- | 3,4-dimethyl phenol. | 2,4-bis(2-hydroxy-4,5-dimethylphenyl)-7-fluoro-. |
| 2,4-dichloro-7-bromo- | Resorcinol | 2,4-bis(o,p-dihydroxyphenyl)-7-bromo-. |
| 2-chloro-4-methyl- | do | 2-(o,p-dihydroxyphenyl)-4-methyl-. |
| 2-chloro-4-phenyl- | do | 2-(o,p-dihydroxyphenyl)-4-phenyl. |

EXAMPLE 7

2-(o-hydroxy-p-methoxyphenyl)-4-(o,p-dimethoxyphenyl)-quinazoline 150 ml. of ethyl ether containing 0.06 mole of diazomethane was added to 2,4-bis(o,p-dihydroxyphenyl)-quinazoline (3.4 g., 0.01 mole) in 50 ml. of methyl Cellosolve at about 25° C., whereupon nitrogen was evolved after 15 min. The resulting precipitate was filtered, dried in vacuo and crystallized from benzene to give the trimethyl derivative, M.P. 178–179° C.

Calculated for $C_{23}H_{20}N_2O_4$ (percent): C, 71.12; H, 5.19; N, 7.21; O, 16.48. Found (percent): C, 71.16; H, 4.79; N, 6.88; O, 16.20.

The NMR (nuclear magnetic resonance) spectrum shows an hydroxy-proton signal at 14.03 p.p.m. (in $CDCl_3$, downfield from tetramethyl silane). This is characteristic of quinazolines having a 2-(o-hydroxyaryl) group; for example substantially the same lower field singal occurs in 2,4 - bis(o - hydroxy - p - butoxyphenyl) quinazoline, 2-(o-hydroxyphenyl) - 4 - methylquinazoline and 2-(o-hydroxyphenyl)-4-methoxyquinazoline. In contrast quinazolines having a 4-(o-hydroxyaryl) group but not a 2-(o-hydroxyaryl) group, such as 4-(o-hydroxy-p-propoxyphenyl)quinazoline, show an hydroxylproton signal at 12.78 p.p.m. in the same solvent.

EXAMPLE 8

2,4-bis(o-hydroxy-p-propoxyphenyl)-quinazoline 2,4-bis(o,p - dihydroxyphenyl) - quinazoline (1.73 g., 0.005 mole), p-propyl bromide (1.30 g., 0.011 mole), and soda ash (1.08 g., 0.011 mole) in methyl Cellosolve (15 ml.) were heated with stirring 60–70° C. for 30 min., 70–80° C. for 30 min., 80–95° C. for 30 min., 95–110° C. for 30 min., then at 110° C. for 45 min. The propylation product, comprising a mixture of the mono-, di- and tripropoxy derivatives together with some unreacted starting material, was isolated by cooling the reaction mass to 0° C., filtering and washing the collected solid with ice-cold methyl Cellosolve. To obtain the bis(o-hydroxy - p - propoxyphenyl) component, the product was slurried in water adjusted to pH 9 with NaOH, filtered, washed with pH 9 water and then with water until the washings were neutral. Crystallized from acetic acid, this product melted at 146–148° C. Chromatographing on a silicic acid column, eluting with 5% acetone in benzene, and recrystallizing from a 3/1 cyclohexane/benzene mixture gave a somewhat higher melting sample, M.P. 149–150° C., insoluble in 5% aqueous NaOH.

Calculated for $C_{26}H_{26}N_2O_4$ (percent): C, 72.54; H, 6.09; N, 6.50. Found (percent): C, 72.28; H, 6,26; N, 6.73.

EXAMPLE 9

2-o-hydroxy-p-propoxyphenyl)-4-(o,p-dipropoxyphenyl)-quinazoline 2,4-bis(o,p-dihydroxyphenyl)-quinazoline (3.46 g., 0.01 mole), n-propyl bromide (11.07 g., 0.09 mole), and potassiumhydroxide (5.56 g., 0.1 mole) and methyl Cellosolve (50 ml.) were heated with stirring for 3½ hours, the temperature being gradually raised from 25 to 80° C. The stirred mixture was held at 80° C. for 3 more hours, then cooled at 0° C. to crystallize the product, which was filtered. Recrystallization from cyclohexane, then from n-hexane, gave the tripropyl derivative, M.P. 143.5–144.5° C.

Calculated for $C_{29}H_{32}N_2O_4$ (percent): C, 73.71; H, 6.83; N, 5.93. Found (percent): C, 73.84; H, 6.63; N, 5.71.

The position of the hydroxy-proton signal in the NMR spectrum at 14.17 p.p.m. (in $CDCl_3$, downfield from $Me_4Si$) indicated that the free hydroxyl group is in the ortho position of the 2-phenyl group (see Example 7).

EXAMPLE 10

2-(o-hydroxy-p - n - butoxyphenyl) - 4 - (o,p - dihydroxyphenyl)-quinazoline, 2-(o-, p - dihydroxyphenyl) - 4 - (o-hydroxy-p-n-butoxyphenyl) - quinazoline, and 2,4-bis(o-hydroxy-p-n-butoxyphenyl)-quinazoline.

2,4-bis(o-, p-dihydroxyphenyl) - quinazoline (3.46 g., 0.01 mole), n-butyl bromide (2.75 g., 0.02 mole), and $Na_2CO_3$ (1.08 g., 0.01 mole) were heated together with stirring in methyl Cellosolve (25 ml.) at 70–80° C. for 30 min., 80–90° C. for 60 min., 80–103° C. for 60 min., and finally at 108° C. for 60 min. The mixture was cooled in ice, filtered, and the cake washed with ice-cold methyl Cellosolve and dried in air.

The above product was extracted with boiling cyclohexane to dissolve the polybutylated derivatives, and filtered to obtain the solid monobutylated derivatives, considered to be a mixture of the two possible (o-hydroxy-p-n-butoxyphenyl) compounds, insoluble in cyclohexane, soluble in 5% aqueous NaOH.

The dibutylated product crystallized from the cyclohexane filtrate. It was chromatographed on a silicic acid column, eluted with 2.5% acetone in benzene, and recrystallized from cyclohexane; M.P. 142-143° C., insoluble in 5% aqueous NaOH.

Calculated for $C_{28}H_{30}N_2O_4$ (percent): C, 73.34; H, 6.59; N, 6.11; O, 13.96. Found (percent): C, 73.09; H, 6.66; N, 6.16; O, 13.95.

EXAMPLE 11

2,4-bis(2-hydroxy-4-octyloxyphenyl)-quinazoline 2,4-bis(o-, p - dihydroxyphenyl)quinazoline (3.46 g., 0.01 mole), n-octyl bromide (4.10 g., 0.021 mole) and methyl Cellosolve (60 ml.) were heated with stirring under $N_2$ at 110–112° C. while a solution of 1.30 g. (0.023 mole) of potassium hydroxide in 40 ml. of methyl Cellosolve was added dropwise during 2 hours. The reaction mixture was stirred for 5 more hours at 110–112° C., cooled to room temperature and distilled at reduced pressure to remove the solvent. The residue was dissolved in boiling cyclohexane, the solution filtered and the filtrate concentrated to about 15 ml. Boiling n-hexane was added and the solution was left to stand for crystallization. The crystallized mass was filtered and recrystallized from n-hexane; M.P. 67–68° C., insoluble in 5% aqueous NaOH.

Calculated for $C_{36}H_{46}N_2O_4$ (percent): C, 75.75; H, 8.12; N, 4.91. Found (percent): C, 75.58; H, 8.22; N, 4.84.

EXAMPLE 12

2,4-bis(2-hydroxy-4-dodecyloxyphenyl)-quinazoline

This product was prepared from n-dodecyl bromide following the procedure of Example 11. It melts at 79–80° C. and is insoluble in 5% aqueous NaOH.

Calculated for $C_{44}H_{62}N_2O_4$ (percent): C, 77.37; H, 9.15; N, 4.10. Found (percent): C, 78.40; H, 9.43; N, 4.41.

EXAMPLE 13

2,4-bis(2-hydroxy-4-octadecyloxyphenyl)quinazoline

Example 11 was repeated with n-octadecyl bromide in place of n-octyl bromide. The product melts at 89–90° C. and is insoluble in 5% aqueous NaOH.

Calculated for $C_{56}H_{86}N_2O_4$ (percent): C, 79.01; H, 10.18; N, 3.29. Found (percent): C, 78.82; H, 9.92; N, 3.44.

EXAMPLE 14

2-(o-hydroxy-p-carbethoxymethyleneoxyphenyl)-4-(o,p-dicarbethoxymethyleneoxyphenyl)-quinazoline 2,4-bis(o-, p-dihydroxyphenyl)quinazoline (3.46 g., 0.01 mole), ethyl bromoacetate (3.6 g., 0.022 mole) and $K_2CO_3$ (2.9 g., 0.022 mole) were heated in boiling acetone (150 ml.) for 45 hours. The mixture was filtered and the acetone distilled off. The residue was extracted with boiling benzene (100 ml.) and filtered. The filtrate was concentrated to 25 ml. by distillation and passed through a silicic acid column to absorb the product, a mixture of alkylated derivatives.

Eluting the column with 2% acetone in benzene gave the pale yellow trialkylated product, insoluble in 5% aqueous NaOH; recrystallized from 1/1 benzene/cyclohexane then from ethanol, it melted at 137–139° C.

Calculated for $C_{32}H_{32}N_2O_{10}$ (percent): C, 63.57; H, 5.33; N, 4.63; O, 26.46. Found (percent): C, 63.78; H, 5.20; N, 4.65; O, 26.34.

Eluting the remaining absorbed material with 5% acetone in benzene removed a more strongly yellow product, soluble in ethanol, difficultly soluble in benzene, soluble in 5% aqueous NaOH, and considered to be a mono-para-carbethoxymethyl derivative of the bis(o-, p-dihydroxyphenyl)quinazoline.

EXAMPLE 15

2-(o-hydroxy-p-carbomethoxymethyleneoxyphenyl)-4-(o,p-dicarbomethoxymethyleneoxyphenyl)-quinazoline The procedure of Example 14 was repeated with methyl bromoacetate (6 moles/mole quinazoline) in place of ethyl bromoacetate. The residue remaining after evaporating the acetone was extracted with boiling methanol (200 ml.) and the solution filtered. The filter cake was recrystallized from benzene to yield the tris-derivative, M.P. 152–154° C.

Calculated for $C_{29}H_{26}N_2O_{10}$ (percent): C, 61.92; H, 4.66; N, 4.98; O, 28.44. Found (percent): C, 62.32; H, 4.62; N, 5.08; O, 28.45.

EXAMPLE 16

2-[o-hydroxy-p-(B-hydroxyethyloxy)-phenyl]-4-[o,p-bis(B-hydroxyethyloxy)-phenyl]quinazoline B-chloroethanol (4.84 g., 0.06 mole) in methylcellosolve (10 ml.) was added dropwise during 1 hour to a stirred solution of 2,4-bis(o,p-dihydroxyphenyl)quinazoline (3.46 g., 0.01 mole), KOH (3.37 g., 0.06 mole) in methylcellosolve (20 ml.) at 90° C. The solution was heated under agitation for 4 more hours at 90° C., cooled to about 25° C. and filtered. The cellosolve was distilled from the filtrate at 36° C./15 mm. Hg pressure and the residue was crystallized from acetone to yield the desired product, M.P. 193–194° C.

Chromatographing a portion of the product on a silicic acid column, using 6/4 acetone/benzene as eluant, followed by recrystallizing from acetone raised the M.P. to 197–197.5° C.

Calculated for $C_{26}H_{26}N_2O_7$ (percent): C, 65.26; H, 5.48; N, 5.86; O, 23.41. Found (percent): C, 65.15; H, 5.41; N, 5.83; O, 23.43.

EXAMPLE 17

2-(o-hydroxyphenyl)-4-aminoquinazoline 2-(o-hydroxyphenyl)-4(3H)-quinazoline (12g.) and excess anhydrous $NH_3$ (50 g.) were heated in ethanol (120 ml.) at 200–220° C. for 24 hours in a 500 ml. stainless steel autoclave. The reactor was cooled and vented; the solvent evaporated; the residue extracted with excess 5% aqueous NaOH, then recrystallized from ethanol. The product, M.P. 222–223° C., showed no C=O stretching band in its IR (infrared) spectrum.

Calculated for $C_{14}H_{11}N_3O$ (percent): C, 70.87; H, 4.67; N, 17.71; O, 6.74. Found (percent): C, 70.86; H, 4.67; N, 17.49; O, 6.77.

Other 4-amino-quinazolines may be prepared as in Example 17 from other quinazolinones as listed below:

| Quinazolinone | Quinazoline |
| --- | --- |
| 2(o-hydroxyphenyl)-6-nitro | 2-(o-hydroxyphenyl)-4-amino-6-nitro. |
| 2-(o-hydroxyphenyl)-6-chloro | 2-(o-hydroxyphenyl)-4-amino-6-chloro. |
| 2-(2-hydroxy-5-chloro-phenyl) | 2(2-hydroxy-5-chloro-phenyl)-4-amino. |
| 2-(2-hydroxy-5-methyl-phenyl)-6-methoxy- | 2(2-hydroxy-5-methylphenyl)-4-amino-6-methoxy-. |

EXAMPLE 18

2-(o-hydroxyphenyl)-4-chloroquinazoline

A stream of phosgene was passed through a mixture of 2-(o-hydroxyphenyl)-4(3H)quinazolinone (7.14 g., 0.03 mole) and dimethylformamide (4.38 g., 0.06 mole) in o-dichloro benzene (100 ml.), the temperature being allowed to rise from about 25° C. to 50° C. The phosgene was fed for another hour, until the reaction mass temperature was treated as follows: The solvent was evaporated (60° C./10 mm. Hg), the residue mixed with 18% weight HCl at 0° C., filtered off and recrystallized from cyclohexane to give 2-(o-hydroxyphenyl)-4-chloroquinazoline, long, yellow needles, M.P. 157° C.

The following 4-Cl-quinazolines may also be prepared by this procedure from the quinazolinones listed under Example 17:

2-(o-hydroxyphenyl)-4-chloro-7-nitroquinazoline;
2-(o-hydroxyphenyl)-4,6-dichloroquinazoline;
2-(2-hydroxy-5-chlorophenyl)-4-chloroquinazoline;
2-(2-hydroxy-5-methylphenyl)-4-chloro-6-methoxy-quinazoline.

EXAMPLE 19

2-(o-hydroxyphenyl)-4-dimethylaminoquinazoline

The remaining phosgenated reaction mass of Example 18 was blown with a stream of nitrogen (to remove excess phosgene and hydrogen chloride) and then with a stream of dimethylamine (excess) until the mixture became homogenous. o-Dichlorobenzene was distilled off at 60° C./11 mm. Hg and the residue recrystallized from a cyclohexane/ethanol mixture; M.P. 147–148.5° C.

Calculated for $C_{16}H_{15}N_3O$ (percent): C, 72.43; H, 5.70; N, 15.84; O, 6.03. Found (percent): C, 72.50; H, 5.81; N, 15.89; O. 6.05.

The following 4-substituted aminoquinazolines may also be prepared by this method from the chloro- and amino-reactants tabulated below:

| 4-chloro-quinazoline | Amine | 4-substituted aminoquinazoline |
|---|---|---|
| 2-(o-hydroxyphenyl)-. | n-Butyl amine. | 2-(o-hydroxyphenyl)-4-butylamino-. |
| 2-(o-hydroxyphenyl)-7-chloro-. | N-methyloctylamine. | 2-(o-hydroxyphenyl)-4-(N-methyloctylamino)-7-chloro-. |
| 2-(o-hydroxyphenyl). | Diethanolamine. | 2-(o-hydroxyphenyl)-4-diethanolamino-. |
| 2-(o-hydroxyphenyl)-7-methyl-. | N-methylaniline. | 2-(o-hydroxyphenyl)-4-(N-methylanilino)-7-methyl-. |

EXAMPLE 20

2-(o-hydroxyphenyl)-4-methoxy-quinazoline (A) Diazomethane (1.32 g.) in ethylether (75 ml.) was mixed with 2-(o-hydroxyphenyl)-4(3H)-quinazolinone (2.38 g.) in diethmylformamide (75 ml.) at 25° C. The reaction mass was filtered, the solvent distilled off in vacuo and the product recrystallized from methanol. It melted at 117–118° C. and its IR spectrum showed absence of a C=O stretching frequency at 6 M.

Calculated for $C_{15}H_{12}N_2O_2$ (percent): C, 71.42; H, 4.79; N, 11.11. Found (percent): C, 71.06; H, 4.80; N, 10.89.

(B) 2-(o - hydroxyphenyl)-4(3H)-quinazolinone (19.1 g., 0.08 mole), methyliodide (17.1 g., 0.12 mole) and $K_2CO_3$ (16.6 g., 0.12 mole) were heated in refluxing acetone for 46 hours. The mixture was filtered, the acetone evaporated, the residue extracted with water and filtered to give a mixture (18.6 g.) of 2-(o-hydroxyphenyl)-4-methoxyquinazoline and 2-(o - hydroxyphenyl)-3-methyl-4(3H)-quinazoline. Extracting with boiling cyclohexane, filtering and cooling the filtrate gave the non-fluorescent 4-methoxy compound (10.8 g., M.P. 117–118° C.). [Recrystallizing the cyclohexane-insoluble residue (7.74 g.) from methanol gave the high fluorescent N-methyl isomer, M.P. 186–187° C., which absorbs so weakly in the 300–400 mµ range as to be impractical for use as a photostabilizer.]

EXAMPLE 21

When Example 20B is repeated with allyl bromide in place of methyl iodide, 2-(o-hydroxyphetnyl)-4-allyloxy-quinazoline, M.P. 104.5–105.5° C. is obtained.

EXAMPLE 22

2-(o-hydroxyphenyl)-4-aminoquinazoline (3 gms.) is heated in refluxing acetic anhydride (10 gms.) for 15 minutes. The mixture is cooled, added to dilute aqueous $NH_3$, and filtered. The recovered solid is recrystallized from ethanol, sublimed at about 200° C. and 0.01 mm. Hg pressure and again recrystallized from ethanol to give 2-(o-hydroxyphenyl)-4-acetamido-quinazoline, M.P. 232–233° C.; structure confirmed by IR and elemental analyses.

EXAMPLE 23

2-(o-hydroxyphenyl) - 4 - aminoquinazoline was converted to a 4-N-polymeric acyl derivative by heating 1 part by weight with 4 parts by weight of an ethylene/methacrylyl chloride copolymer containing 15% methacrylyl units in boiling toluene for 19 hours. The mixture was cooled, poured into 200 parts methanol containing 10 parts conc. aq. $NH_3$, stirred and filtered. The recovered solid product was washed with methanol and dried in vacuo.

EXAMPLE 24

The product obtained by condensing p-cresol with 2,4-dichloroquinazoline, as described in Example 4B, was dissolved in dry pyridine, cooled to 0° C., and treated with an excess of acetal chloride. The mixture was warmed to 40–50° C., and after ½ hour was poured on a mixture of ice and conc. HCl. The precipitated solid product was filtered, washed with water, dried and recrystallized from ethanol to yield 2-(2-hydroxy-5-methylphenyl)-4-(5-acetoxy-2-methylphenyl)quinazoline, M.P. 217–218° C.

EXAMPLE 25

Repeating Example 24 with methacrylylchloride yields 2-(2-hydroxy - 5 - methylphenyl) - 4 - (5-methacryloxy-2-methylphenyl)-quinazoline, M.P. 170–171° C.

EXAMPLE 26

The product obtained in Example 4B (1.5 g.) in dry toluene (50 cc., dried by distilling off the water-toluene azeotrope) was added to a 110° C. solution of an ethylene/methacrylyl chloride copolymer (2.5 g., containing 18% by weight methacrylyl chloride units and having a melt index of about 100 determined by ASTM–D–1238–57T) in dry toluene (225 cc.). The mixture was heated at 110° C. for 20 hours. The reaction mass was cooled, poured into about 4 volumes of acetone containing 5% by weight of conc. aq. $NH_3$, filtered, and the collected solid washed with acetone and dried in vacuo. Structure of this product as 2-(2-hydroxy-5-methylphenyl)-4-(2-hydrocarbonyloxy-5-methylphenyl)quinazoline, where the hydrocarbonyloxy group corresponds to the copolymeric ethylene/methacrylate radical, was confirmed by IR spectrum of a pressed film of the recovered product.

PHOTOSTABILITY EXAMPLES

The examples below illustrate the marked photostability of the present compounds and their suitability as UV absorbers to protect light-sensitive substrate materials against degradation by light.

Test media

Since the quinazolines of this invention are normally solid, they are conveniently tested, dissolved or intimately dispersed in a suitable light-transmitting carrier; for example, in solvent such as acetonitrile (representative of polar substrates) or hexane (representative of non-polar substrates) or in a film-forming transparent polymer such as a polyacrylonitrile or a polyamide. In general the candidate photostabilizer is incorporated into the carrier in an amount required to impart an optical density (O.D.) in the 1–1.5 range to the final composition:

(A) For light exposure tests, solutions were placed in 3 cc. quartz cells having a 1 cm. optical path.

(B) To prepare polyacrylonitrile films the candidate photostabilizer together with one part of particulate commercial film-forming polyacrylonitrile (consisting essentially of a copolymer of 93.6 parts acrylonitrile, 6 parts methyl acrylate and 0.4 part sodium p-styrene sulfonate) and 5 parts of dimethylformamide are heated at about 100° C. for a few minutes to form a clear solution, which is poured on a clean, glass plate and spread with a doctor knife having a 16 mil clearance. The dimethylformamide is evaporated by heating such plate in a vacuum oven (60° C./about 100 mm. Hg pressure) for 2 hours, to give the final film, 1–1.3 mils thick.

(C) To prepare polyamide films the particulate candidate stabilizer is intimately dry blended with a powdered commercial nylon 66 (hexamethylene diamine/adipic acid condensation polymer), the amounts being adjusted to provide an optical density of 1–1.5 in the final film. The blend is preheated at 270° C. for 0.5 minute and then pressure molded between platens in a Carver press, which develops about 8000 lbs. total pressure in about 2 seconds, whereupon cooling water is circulated through the press platens to cool the resulting substantially clear, about 1–1.5 mil thick, film.

Test method

A convenient measure of a compound's photostability is the inverse of the quantum yield ($\phi_R^{-1}$) of its photo chemical reactions, either through self-degradation or reaction with its surroundings. Thus, $\phi_R^{-1}$ represents the average number of times a photo-activatable, i.e. light-absorbing molecule, must be photo-activated before it reacts to produce inactive products. In other words (since the number of photo-excited molecules equals the number of quanta absorbed), $\phi_R^{-1}$ is the ratio of the number of quanta absorbed to the number of molecules that have undergone photochemical reaction.

In this method, the photo-stabilizer candidate contained in a suitable substrate as described above is exposed to radiation from a standard xenon arc lamp such that the emitted radiation first passes through a Corning 0-54 filter to filter out wavelengths below 295 m$\mu$ and through a 10 cm. thick water barrier to remove infrared before it strikes the sample. The extinction coefficient (E) of the test sample's longest wavelength absorption peak and the optical density are determined in the usual way using a Cary spectrophotometer.

The number of quanta absorbed is determined with a calibrated 935 photoelectric cell (a series of quartz diffusion discs, disposed along the length of a polished cylinder to diminish directional sensitivity and connected to a microammeter) by measuring the intensities of the radiation that strikes the film surface, $I_0$, and that passes through the film, $I_t$. The current difference, $I_0-I_t$, is directly related to the total quanta absorbed and thus is useful per se for comparing compounds. The actual quanta absorbed per unit substrate volume per unit time is $k$ ($I_0-I_t$), where $k$ is a constant, $1.74 \times 10^{16}$ quanta/cm.$^2$/hr., determined by calibrating the cell against a uranyl oxalate actinometer according to known techniques.

$I_0$, $I_t$ and O.D. (optical density) readings at the longest wavelength absorption peak are taken periodically until the optical density has decreased 10–15%, which generally requires from 100 to 1000 hours depending on the composition under test.

The number of molecules photolyzed is determined from the rate at which the optical density decreases with exposure time. This correlation is operative here because the compounds involved degrade to products which are optically inactive in the region of the monitored peak, as indicated by the fact that the peak's optical density decreases linearly with time and its wavelength remains unchanged during the indicated period.

The photostability is calculated as follows:

$$\phi_R^{-1} = 0.0286[(I_0-I_t) \cdot \epsilon]/(\Delta O.D./\Delta t)$$

where
$I_0$=the incident light intensity,
$I_t$=the transmitted light intensity,
$\epsilon$=the extinction coefficient of the photostabilizer, O.D./D.C., where O.D.=optical density, $d$=sample thickness in centimeters, and c=compound concentration in moles/liter, O.D. (optical density) = log $I_0/I_t$ O.D./$\Delta t$=how optical density at peak absorption changes with time, or the slope, $a$, of the linear curve, O.D.=$a.t+b$, where $t$ is the time in hours and $b$ the optical density at time zero, and 0.0286=a composite constant including the cell calibration constant described above.

$\phi_R^{-1}$ is an objective measure of the photostability of a compound. It takes into account the decrease in optical density with time, the broadness of the absorption spectrum ($I_0-I_t$), and the intensity of absorption ($\epsilon$). The smaller the decrease in optical density with time, the longer the UV screener will last and the longer the protection to the substrate. The broader the absorption band and the higher the extinction coefficient, the smaller is the amount of UV screener to provide a given optical density (optical densities of 1–2 correspond to 90–99% absorption). Good photostability ($\phi_R^{-1}$) values are in the order of at least about 10,000.

If equal amounts of two UV screeners having roughly equal absorption characteristics (and molecular weights) are added to a substrate and if $\phi_R^{-1}$ of one compound is ten times that of the other, then the first compound will afford protection for a period of time ten times longer.

Non-fluorescent

The subject 2(o-hydroxyphenyl)quinazolines are substantially non-luminescent under ordinary (room temperature) conditions in that their quantum yields of luminescence are less than 0.5%. A substance that has absorbed light has by definition a higher energy content than the original ground state. Left alone, such "photoactivated molecules" may revert to its ground state or undergo change into another substance. One way to revert to its ground state is to emit light. Such luminescence (fluorescence or phosphorescence) can be represented as an emission spectrum. The amount of emitted light relative to the amount originally absorbed is the quantum yield of luminescence (fluoroescence, phosphorescence or both). Low luminescence (less than about 0.5% quantum yield) is required to achieve good photostability.

EXAMPLE 27

For comparison with prior art, the quinazolines are tabulated below as follows:

(A) 2-(o-hydroxyaryl)-4-X-quinazolines including mono- and di-hydroxyaryl tapes.
(B) 2,4-bis(o-hydroxyaryl)quinazolines including mono- and di-hydroxyaryl tapes.

In the tables below
Me=methyl
Et=ethyl
Pr=propyl
Bu=butyl
Ph=phenyl
Oct.=octyl

A. 2-(o-HYDROXYARYL)-4-X-QUINAZOLINES AND PYRIMIDINES

Photostability, $\phi_R^{-1} \times 10^{-5}$ substrate as below containing Quinazoline (Q) or Pyrimidine (P)

| Substituents | | Polyacrylonitrile | | Nylon | | Acetonitrile | | Hexane | |
|---|---|---|---|---|---|---|---|---|---|
| 2-(phenyl) | 4-X | Q | P | Q | P | Q | P | Q | P |
| o-HO | H | 49 | | 68 | | 16 | | 75 | |
| o-HO | Me | 56 | | 71 | | 160 | | 42 | |
| o-HO | Ph | 98 | | 105 | | 220 | | 43 | |
| o-HO | NH$_2$ | .51 | | 1.4 | | 1.7 | | | |
| o-HO | NMe$_2$ | .88 | | 3.3 | | 8.3 | | 8 | |
| o-HO | OMe | | | | | 1.3 | | 13 | |
| o,p-(HO)$_2$ | Me | | a 3.7 | | a 12 | | a 44 | | a .06 |
| o-HO, p-PrO | Me | | | | b 13 | | b 1.5 | | b 1.4 |
| o-OH | NHCOCH$_3$ | >30 | | >30 | | >30 | | >30 | | a 2(o,p-dihydroxyphenyl)-4,6-dimethyl pyrimidine.
b 2(o-hydroxy-p-propoxyphenyl)-4,6-dimethylpyrimidine.

The results show that the simple 4–X=H, methyl or phenyl quinazolines are remarkably photostable, much more so than the 4-amino and 4-alkoxy derivatives and the prior art pyrimidines (such as French Pat. No. 1,396,684).

The above result also indicate generally that, the more positive the Hammett para sigma values of the 4-substituent (R), the more photostable the molecule.

Pat. No. 2,953,818 by mixing the quinazoline with a mixture containing 40% wt. polyvinylfluoride in N,N-dimethylacetamide:

Quinazoline 2,4-bis(o,p-dihydroxyphenyl)-
2,4-bis(o-hydroxy-p-propoxyphenyl)-
2,4-bis(o-hydroxy-p-dodecyloxyphenyl)-
2,4-bis(o-hydroxy-p-octadecyloxyphenyl)-

B. 2,4-BIS(o-HYDROXYARYL)QUINAZOLINES AND PYRIMIDINES

| Substituents | | Polyacrylonitrile | | Nylon | |
|---|---|---|---|---|---|
| 2-(phenyl) | 4-(phenyl) | Q | P | Q | P |
| 2-HO, 5-Me | 2-HO, 5-Me | 13 | | 13 | |
| o,p-(HO)₂ | o,p-(HO)₂ | 33 | 5.3 | 24 | 17 |
| o-HO, p-BuO | o-HO, p-BuO | | | 61 | |
| o-HO, p-OctO | o-HO, p-OctO | 11 | | 24 | |
| o-HO, p-MeO | o,p-(MeO)₂ | 90 | | 78 | |
| o-HO, p-PrO | o,p-(PrO) | | | 100 | |
| o-HO, p-MeOOCCH₂O | o,p-(MeOOCCH₂O)₂ | 67 | | 23 | |
| o-HO, p-EtOOCCH₂O | o,p-(EtOOCCH₂O)₂ | | | 20 | |
| o-HO, p-PrO | o-HO, p-PrO | | | 110 | 27 |

The Table B results show:

(1) The 2,4-bis(hydroxyaryl)quinazolines have high photostability in the various substrates;

(2) Judicious substitution—etherification—can further enhance the photostability and better adapt the photostabilizer to a particular substrate; and (3) The quinazolines as a class appear to be significantly more photostable than the analagous pyrimidines.

EXAMPLE 28

2,4-bis(o,p-dihydroxyphenyl) - 7 - methylquinazoline and the isomeric 2,3-bis(o,p-dihydroxyphenyl-6-methyl) quinoxaline (British Pat. No. 1,043,145) were evaluated in nylon by the above procedure with the following results:

Photostabilizer: Photostability, $\phi_R^{-1}$
Quinazoline _____ 5,400,000
Quinoxaline _____ 330,000

Thus the quinazoline of this invention is about 16 times more photostable than the prior art quinoxaline.

EXAMPLE 29

Poly[2-(2-hydroxy-5-methylphenyl)-4-(5-methacryloxy-2-methylphenyl)quinazoline]

An azoisobutyronitrile (0.1 g.) solution in benzene (5 ml.) was added to a solution of the methacrylate of Example 25 (14.2 g.) in benzene (45 ml.), which had been swept with dry O₂-free nitrogen and warmed to 70° C. The mixture was heated at 75° C. for 48 hours under a nitrogen sweep, then poured into boiling n-butanol (to precipitate the polymer). The precipitate was filtered to give the polymeric product (10 g.), softening at 290° C.

The polymeric quinazoline was blended with polyacrylonitrile by dissolving the two polymers in N,N-dimethylformamide, casting the solution on a glass plate and evaporating the solvent to yield a light stable polymeric film.

In addition to wet blending from a common solvent as above, the polymeric quinazoline may also be blended with other polymeric materials by milling; or it may be coated on shaped articles by casting from solution, dipping, brushing or spraying, using procedures described by Tocker in U.S. Pat. No. 3,265,760.

EXAMPLE 30

UV-screening polyvinyl fluoride film

Polyvinylfluoride organosols containing 1% wt. of a quinazoline as identified below based on the polyvinylfluoride were prepared by the procedure described in U.S.

2-(o-hydroxy-p-methoxyphenyl)-4-(o,p-dimethoxyphenyl)-
2-(o-hydroxy-p-carbethoxymethyloxyphenyl)-4-(o,p-dicarbethoxymethyloxyphenyl)-
2-(o-hydroxyphenyl)-4-methyl-
2-(o-hydroxyphenyl)-4-methoxy- Each organosol was cast on a ferrate type plate and briefly heated under infrared radiation to coalesce the composition into a self-supporting partially dried gel film. The gel film was placed in a frame (to prevent relaxation and to induce biaxial orientation during subsequent drying by heating), then heated at 185° C. for 2 to 3 minutes under a high velocity air stream to evaporate the residual dimethylacetamide solvent and provide a clear transparent film.

Exposed in an Atlas Sunshine Arc Weather-Ometer Model XW–R, wherein the sample is subjected to a complex environment which includes heat, ultraviolet light, visible light and moisture, these films containing quinazolines of this invention exhibited outstanding retention of their ultraviolet light screening properties, and thus suitable to protect coated surfaces and packaged materials from ultraviolet radiation.

EXAMPLE 31

UV-screening polyvinyl fluoride film

Example 30 was repeated with the polymeric quinazoline described in Example 29 at a concentration of 1.5% by weight of the polyvinylfluoride film. The doped film exhibited high resistance to degradation on exposure to sunlight.

Polyvinyl fluoride films containing hydroxyaryl quinazoline UV absorbers of this invention, as illustrated in Examples 30 and 31, are particularly useful as protective coatings for outdoor structural components. For example laminar structures having high resistance to photodegradation may be prepared by the method described in U.S. Pat. No. 3,265,760 for laminating the films with adhesive polymeric resins, e.g. polyester/fiberglass, compositions.

EXAMPLE 32

Photostabilized automotive lacquer

A lacquer is prepared by blending 28.5 parts polymethylmethacrylate) having 1.17 relative viscosity (0.5% solution in ethylene dichloride) and a 105° C. glass transition temperature, 28.5 parts methyl methacrylate/butyl acrylate 82/18 copolymer having a 1.17 relative viscosity (0.5% in ethylene dichloride) and a 61° C. glass transition temperature, 20 parts cellulose acetate butyrate (20 second viscosity), 23 parts alkyd resin plasticizer (0.41 coconut oil/2.93 ethylene glycol/2.43 phthalic anhydride, acid number 6–8), in 70/30 toluene/acetone solution, and 2- (o-hydroxy-p-propoxyphenyl) - 4-(o,p-dipropoxyphenyl)quinazoline designated HTPQ in various amounts as tabulated below.

A second such composition was prepared containing additionally aluminum flake pigment at a pigment/binder ratio of 2.1/100.

The above coating compositions were reduced with an equal volume of industrial lacquer thinner, sprayed on conventionally primed auto body panels, then baked for 30 minutes at 300° F. to a film about 2.5 mils thick. Resistance of the coatings to photodegradation was determined by exposure (along with appropriate controls) to accelerated weathering conditions in a Weather-Ometer. The results are expressed below in terms of 20° gloss (the higher the rating the better) and checking (10=perfect, 0=very bad checking).

RESISTANCE OF AUTOMOTIVE LACQUER TO ACCELERATED WEATHERING

| Percent UV absorber | 20° gloss—exposure, hours | | | | | Checking—exposure, hours | | | |
|---|---|---|---|---|---|---|---|---|---|
| | 0 | 300 | 600 | 900 | 1,200 | 300 | 600 | 900 | 1,200 |
| Clear lacquer: | | | | | | | | | |
| None (control) | 74 | 55 | | | | 1 | | | |
| 1.0 HTPQ | 78 | 56 | | | | 4 | | | |
| 2.0 HTPQ | 81 | 64 | 55 | 52 | | 8 | 4 | 2 | |
| 2.0 commercial X | 79 | 52 | 52 | 53 | | 4 | 2 | 0 | |
| 2.5 commercial X | 74 | 54 | 53 | 45 | | 5 | 3 | 3 | |
| Pigmented lacquer: | | | | | | | | | |
| None (control) | 67 | 41 | 24 | 12 | | 6 | 4 | 2 | |
| 0.5 HTPQ | 70 | 54 | 29 | 15 | | 6 | 6 | 4 | |
| 1.0 HTPQ | 76 | 46 | 41 | 24 | 9 | 9 | 8 | 7 | 2 |
| 2.0 HTPQ | 71 | 52 | 49 | 20 | 15 | 9 | 9 | 8 | 3 |
| 2.0 commercial X | 73 | 58 | 49 | 31 | 8 | 9 | 8 | 7 | 1 |
| 2.5 commercial X | 66 | 58 | 44 | 28 | 10 | 9 | 8 | 7.5 | 1 |

The superiority of the quinazoline of this invention to the commercial UV absorber normally employed in such coatings is evident from the above data, particularly at long exposures.

Good results are also obtained with 2-(o-hydroxyphenyl)-4-(p-methoxyphenyl)quinazoline in the above lacquers.

Furthermore, it should be noted that such lacquer containing quinazoline UV absorbers of this invention are particularly outstanding in their ability to withstand severe bake conditions, e.g. 350° F. for 180 minutes and 400° F. for 30 minutes and still impart to the baked finish high resistance to weathering.

EXAMPLE 33

Photostabilized dyed nylon carpeting

A carpeting material made from bulk continuous filament polyethyleneoxide-modified polyhexamethylene adipamide of the type described in U.S. Pat. No. 3,329,557 was impregnated with dye and photostabilizer as follows: The quinazoline of Example 32, as a 30% weight solution in N,N-dimethylformamide was added to an aqueous dye bath containing 0.5% weight of the copper complex of p-chloro-o,o'-dihydroxyazobenzene (a red azo dye described in Brit. Pat. No. 1,091,756), 3% weight of alkanol ND hydrocarbon sodium sulfonate surfactant, and monoand di-sodium phosphates sufficient to buffer the mixture to pH 7. The photostabilizer concentration was 0.5% weight. The carpeting sample was immersed in the boiling bath for one hour, removed, rinsed and dried. These dyeings had high fastness to light as indicated by 120 hour exposure tests in a xenon Fade-Ometer.

EXAMPLE 34

Photostabilized polypropylene resin

A polypropylene resin (100 parts by weight) containing no stabilizing additives and available as "Profax" polypropylene was milled at 175° C., and the antioxidants Santowhite Powder (.2 part) understood to be 4,4'-butylidene-bis(tert.butyl-m-cresol), and dilaurylthiodipropionate (.5 part) were blended in, followed by the UV screen 2-(o-hydroxy-p-propoxyhenyl) - 4 - (o,p-diproxyphenyl) quinazoline (1 part). The resulting blend was milled for an additional 10 minutes, removed from the mill, cold rolled, to provide a stabilized product having high resistance to oxidation and photodegradation under ambient outdoor conditions.

EXAMPLE 35

Light-stabilized polystyrene

Powdered polystyrene and 0.4% wt. of powdered 2-(o-hydroxyphenyl)-4-nonylquinazoline in one run and 2-(o-hydroxylphenyl)-4-heptadecylquinazoline in a second run were dry-mixed and extruded at 213° C. to form substantially white sheets 2.5 inches by 10 mils thick, useful as indoor fluorescent light diffusers showing high resistance to yellowing.

EXAMPLE 36

Light-stabilized high temp. polyamide

A fiber-spinning solution containing 18% wt. metaphenylene isophthalamide in N,N-dimethylacetamide is diluted with sufficient N,N-dimethylacetamide containing 2 - ( - hydroxyphenyl) - 4 - phenyl - 6 - chloroquinazoline to form a solution containing 10% wt. of the polyamide and 0.2% wt. of the quinazoline.

The solution can be spun into fibers or cast as films to give polyamide fibers and films having high resistance to discoloration by light.

EXAMPLE 37

Photostabilized polyvinyl butyral tinting ink composition

A tinting ink was prepared by dissolving polyvinylbutyral having a hydroxyl content of 23 percent in dimethylformamide to give a viscosity of 90 centipoise and then adding to 100 parts of this solution 1.43 parts of the dye Violet 2R Base, 0.87 part of the dye Oil Blue A, and 20.0 parts of 2,4-bis(o-p-dihydroxyphenyl)quinazoline. Following the general procedure described in U.S. Pat. 2,739,080, commercial, plasticized polyvinylbutyral sheeting, "Butacite" B–106, was printed with this ink by a rotogravure process, seasoned at 65° C. for six days to normalize the dyes by diffusion, conditioned to 23% relative humidity and laminated in clear plate and heat absorbing (LOF E–Z Eye) glass. The colored laminates showed excellent resistance to fading on exposure in Arizona in an accelerated exposure device (EMMA–Desert Sunshine Exposure Tests) for accumulated exposures of 120,000 and 240,000 langleys, and are thus useful as tinted automotive windshields.

It will be noted that in this system the quinazoline serves as a dye component (light yellow) for the tinting composition as well as the photostabilizer for the other components of the composition.

As seen above, the subject invention provides novel ultra-violet absorbers of high inherent photostability which are useful in a wide variety of substrates and applications.

The foregoing detailed description has been given for clearness of understanding only and no unnecessary limi-

What is claimed is:

1. A 2-(o-hydroxyaryl)quinazoline of the formula

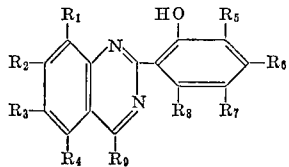

wherein $R_1$, $R_2$, $R_3$ and $R_4$ are selected from the group consisting of hydrogen, alkyl, alkoxy and chlorine, said alkyl and alkoxy containing up to 18 carbon atoms; $R_5$, $R_6$, $R_7$ and $R_8$ are selected from the group consisting of hydrogen, hydroxy, alkyl, alkoxy, hydroxyalkoxy, carbalkoxyalkyloxy and chlorine, said carbon radicals containing up to 18 carbon atoms; and $R_9$ is selected from the group consisting of hydrogen, chlorine, amino, alkylamino, dialkylamino, acylamino, alkyl, alkoxy, alkenyloxy, phenyl and phenyl substituted by substituents selected from the group consisting of hydroxy, acyloxy, alkyl, alkoxy, hydroxyalkoxy and carbalkoxyalkyloxy, said carbon groups containing up to 18 carbon atoms; wherein said acyl groups are carboxylic acyl.

2. A compound of claim 1 wherein $R_1$, $R_4$ and $R_8$ are hydrogen.

3. A compound of claim 1 wherein $R_9$ is chloro.

4. A compound of claim 1 wherein $R_1$, $R_2$, $R_3$ and $R_4$ are selected from the group consisting of hydrogen and alkyl, $R_5$, $R_6$, $R_7$ and $R_8$ are selected from the group consisting of hydrogen, alkyl, hydroxy, alkoxy, hydroxyalkoxy and carbalkoxyalkyloxy and $R_9$ is selected from the group consisting of hydrogen, alkyl, alkoxy, phenyl and phenyl substituted by hydroxy, alkyl, and alkoxy, said carbon groups containing up to 18 carbon atoms.

5. A compound of claim 4 wherein $R_1$, $R_4$ and $R_8$ are hydrogen.

6. 2,4-bis(o,p-dihydroxyphenyl)-quinazoline.

7. 2 - (o-hydroxy-p-methoxyphenyl)-4-(o,p-dimethoxyphenyl)-quinazoline.

8. 2 - (o - hydroxy - p - propoxyphenyl)-4-(o,p-dipropoxyphenyl)-quinazoline.

9. 2-(o-hydroxyphenyl)-4-methylquinazoline.

10. 2-(o-hydroxyphenyl)-4-nonyl-quinazoline.

11. 2-(o-hydroxyphenyl)-4-heptadecyl-quinazoline.

12. 2-(o-hydroxyphenyl)-4-phenyl-6-chloroquinazoline.

13. 2-(2' - hydroxy - 5' - methylphenyl)-4-(2'-methyl-5'-methacryloxyphenyl) quinazoline.

References Cited

UNITED STATES PATENTS 3,169,129    2/1965    Rodgers et al. _____ 260—251

ALEX MAZEL, Primary Examiner

R. V. RUSH, Assistant Examiner

U.S. Cl. X.R.

252—300, 402, 403; 260—45.8, 247.1. 247.2 B, 247.5 B, 256.4 Q, 256.5 R; 296—84 R